(12) United States Patent
Ferguson et al.

(10) Patent No.: US 9,578,017 B2
(45) Date of Patent: Feb. 21, 2017

(54) SECURE MANAGEMENT OF OPERATIONS ON PROTECTED VIRTUAL MACHINES

(71) Applicant: Microsoft Technology Licensing, LLC, Redmond, WA (US)

(72) Inventors: Niels T. Ferguson, Redmond, WA (US); Yevgeniy Anatolievich Samsonov, Redmond, WA (US); Kinshuman Kinshumann, Redmond, WA (US); Samartha Chandrashekar, Redmond, WA (US); John Anthony Messec, Bellevue, WA (US); Mark Fishel Novak, Newcastle, WA (US); Christopher McCarron, Hartford, CT (US); Amitabh Prakash Tamhane, Redmond, WA (US); Qiang Wang, Bellevue, WA (US); David Matthew Kruse, Kirkland, WA (US); Nir Ben-Zvi, Bellevue, WA (US); Anders Bertil Vinberg, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 14/504,096

(22) Filed: Oct. 1, 2014

(65) Prior Publication Data

US 2015/0319160 A1    Nov. 5, 2015

Related U.S. Application Data

(60) Provisional application No. 61/988,786, filed on May 5, 2014.

(51) Int. Cl.
*G06F 21/57* (2013.01)
*H04L 29/06* (2006.01)
(Continued)

(52) U.S. Cl.
CPC ...... *H04L 63/0823* (2013.01); *G06F 9/45558* (2013.01); *G06F 21/57* (2013.01);
(Continued)

(58) Field of Classification Search
None
See application file for complete search history.

(56) References Cited

U.S. PATENT DOCUMENTS

| 7,380,119 B2 | 5/2008 | Bade et al. |
| 7,836,299 B2 | 11/2010 | England et al. |

(Continued)

FOREIGN PATENT DOCUMENTS

| EP | 2577539 | 4/2013 |
| WO | WO 0163831 | 8/2001 |

(Continued)

OTHER PUBLICATIONS

Garfinkel, et al., "Terra: A Virtual Machine-Based Platform for Trusted Computing", In Proceedings of the 19th ACM symposium on Operating systems principles, Oct. 19, 2003, 14 pages.

(Continued)

*Primary Examiner* — Hadi Armouche
*Assistant Examiner* — Malcolm Cribbs
(74) *Attorney, Agent, or Firm* — Aneesh Mehta; Kate Drakos; Micky Minhas

(57) ABSTRACT

Deploying an encrypted entity on a trusted entity is illustrated herein. A method includes, at a trusted entity, wherein the trusted entity is trusted by an authority as a result of providing a verifiable indication of certain characteristics of the trusted entity meeting certain requirements, receiving an encrypted entity from an untrusted entity. The untrusted entity is not trusted by the authority. At the trusted entity, a trust credential from the authority is used to obtain a key from a key distribution service. The key distribution service is trusted by the authority. The key is used to decrypt the encrypted entity to allow the encrypted entity to be deployed at the trusted entity.

22 Claims, 8 Drawing Sheets

(51) Int. Cl.
*H04L 9/32* (2006.01)
*G06F 21/62* (2013.01)
*H04L 9/08* (2006.01)
*H04W 12/10* (2009.01)
*G06F 9/455* (2006.01)

(52) U.S. Cl.
CPC ........ *G06F 21/6209* (2013.01); *H04L 9/0822* (2013.01); *H04L 9/0894* (2013.01); *H04L 9/3247* (2013.01); *H04L 63/062* (2013.01); *H04L 63/12* (2013.01); *H04W 12/10* (2013.01); *G06F 2009/4557* (2013.01); *G06F 2009/45587* (2013.01); *G06F 2009/45595* (2013.01); *H04L 2209/127* (2013.01); *H04L 2209/24* (2013.01); *H04L 2209/72* (2013.01); *H04L 2463/062* (2013.01)

(56) References Cited

U.S. PATENT DOCUMENTS

| | | | |
|---|---|---|---|
| 7,860,802 B2 * | 12/2010 | Pandya | G06F 21/10 705/50 |
| 8,060,876 B2 | 11/2011 | Smith et al. | |
| 8,065,713 B1 | 11/2011 | Vainstein et al. | |
| 8,074,262 B2 | 12/2011 | Scarlata | |
| 8,151,262 B2 | 4/2012 | Challener et al. | |
| 8,208,637 B2 | 6/2012 | Ellison | |
| 8,249,257 B2 | 8/2012 | Brutch et al. | |
| 8,341,427 B2 | 12/2012 | Auradkar et al. | |
| 8,356,347 B2 | 1/2013 | Berger et al. | |
| 8,375,437 B2 | 2/2013 | Linsley et al. | |
| 8,411,863 B2 | 4/2013 | Ureche et al. | |
| 8,732,462 B2 | 5/2014 | Bhathena et al. | |
| 8,909,939 B1 | 12/2014 | Beda, III et al. | |
| 9,172,683 B2 | 10/2015 | Farrugia et al. | |
| 2001/0055396 A1 | 12/2001 | Jevans | |
| 2003/0226031 A1 | 12/2003 | Proudler et al. | |
| 2005/0166051 A1 | 7/2005 | Buer | |
| 2006/0020781 A1 | 1/2006 | Scarlata et al. | |
| 2006/0126836 A1 | 6/2006 | Rivas | |
| 2006/0155988 A1 | 7/2006 | Hunter et al. | |
| 2006/0256108 A1 * | 11/2006 | Scaralata | G06F 21/57 345/418 |
| 2007/0016801 A1 * | 1/2007 | Bade | G06F 21/57 713/193 |
| 2007/0094719 A1 | 4/2007 | Scarlata | |
| 2008/0046581 A1 * | 2/2008 | Molina | H04L 63/08 709/229 |
| 2008/0209221 A1 | 8/2008 | Vennelakanti et al. | |
| 2008/0244569 A1 * | 10/2008 | Challener | G06F 21/57 718/1 |
| 2009/0064292 A1 * | 3/2009 | Carter | G06F 21/57 726/5 |
| 2009/0086979 A1 | 4/2009 | Brutch et al. | |
| 2009/0125974 A1 | 5/2009 | Zhang et al. | |
| 2009/0154709 A1 | 6/2009 | Ellison | |
| 2009/0204964 A1 * | 8/2009 | Foley | G06F 21/53 718/1 |
| 2009/0271618 A1 * | 10/2009 | Camenisch | G06F 21/445 713/155 |
| 2009/0307487 A1 | 12/2009 | Movva et al. | |
| 2010/0082960 A1 | 4/2010 | Grobman et al. | |
| 2010/0325628 A1 * | 12/2010 | Haga | G06F 21/575 718/1 |
| 2011/0029672 A1 | 2/2011 | Agneeswaran | |
| 2011/0154031 A1 | 6/2011 | Banerjee et al. | |
| 2011/0202916 A1 | 8/2011 | VoBa et al. | |
| 2011/0246757 A1 | 10/2011 | Prakash et al. | |
| 2011/0302415 A1 | 12/2011 | Ahmad et al. | |
| 2012/0030676 A1 | 2/2012 | Smith et al. | |
| 2012/0089831 A1 | 4/2012 | Rozas | |
| 2012/0117565 A1 | 5/2012 | Staelin et al. | |
| 2012/0204020 A1 * | 8/2012 | Novak | H04L 63/1433 713/2 |
| 2012/0265976 A1 | 10/2012 | Spiers et al. | |
| 2012/0328105 A1 | 12/2012 | Mukkara et al. | |
| 2013/0054979 A1 | 2/2013 | Basmov et al. | |
| 2013/0086383 A1 | 4/2013 | Galvao De Andrade et al. | |
| 2013/0097296 A1 * | 4/2013 | Gehrmann | G06F 9/4856 709/223 |
| 2013/0191648 A1 | 7/2013 | Bursell | |
| 2014/0007087 A1 * | 1/2014 | Scott-Nash | G06F 21/53 718/1 |
| 2014/0019753 A1 | 1/2014 | Lowry et al. | |
| 2014/0019959 A1 | 1/2014 | Dodgson et al. | |
| 2014/0025961 A1 * | 1/2014 | Mackintosh | G06F 9/45533 713/189 |
| 2014/0052877 A1 * | 2/2014 | Mao | H04L 61/103 709/245 |
| 2014/0075494 A1 | 3/2014 | Fadida et al. | |
| 2014/0089658 A1 | 3/2014 | Raghuram et al. | |
| 2014/0089660 A1 | 3/2014 | Sarangshar et al. | |
| 2014/0095868 A1 * | 4/2014 | Korthny | G06F 21/6218 713/165 |
| 2014/0108784 A1 | 4/2014 | Pendarakis et al. | |
| 2014/0173279 A1 | 6/2014 | Goodman et al. | |
| 2014/0201525 A1 | 7/2014 | Korthny et al. | |
| 2014/0281497 A1 * | 9/2014 | Medvinsky | H04L 9/006 713/156 |
| 2015/0019864 A1 | 1/2015 | Pate | |
| 2015/0127795 A1 * | 5/2015 | Jagana | H04L 67/10 709/223 |
| 2015/0134965 A1 | 5/2015 | Morenius et al. | |
| 2015/0135311 A1 * | 5/2015 | MacKintosh | G06F 9/45558 726/22 |
| 2015/0143508 A1 | 5/2015 | Halibard | |
| 2015/0178504 A1 | 6/2015 | Nystrom et al. | |
| 2015/0188917 A1 | 7/2015 | McCarron et al. | |
| 2015/0318986 A1 | 11/2015 | Novak et al. | |
| 2016/0357988 A1 | 12/2016 | Ferguson et al. | |

FOREIGN PATENT DOCUMENTS

| WO | WO 2007087558 | 8/2007 |
|---|---|---|
| WO | 2009123640 | 10/2009 |
| WO | WO 2012024508 | 2/2012 |

OTHER PUBLICATIONS

Berger, et al., "Security for the Cloud Infrastructure: Trusted Virtual Data Center Implementation", In Proceedings of IBM Journal of Research and Development, vol. 53, Issue 4, Jul. 2009, 12 pages.

U.S. Appl. No. 14/140,214, Nystrom, et al., "Virtual Machine Assurances", filed Dec. 24, 2013.

Basmov, et al., "Secure Creation of Encrypted Virtual Machines from Encrypted Templates", unfiled US Patent Application.

Zvi, et al., "Secure Transport of Encrypted Virtual Machines with Continuous Owner Access", unfiled US Patent Application.

Olzak, Tom, "Chapter 8—UEFI and the TPM: Building a foundation for platform trust", Published on: Jun. 19, 2012, Available at: http://wayback.archive.org/web/20131018023117/http:/ resources. infosecinstitute.com/uefi-and-tpm-2.

"International Search Report & Written Opinion Issued in PCT Application No. PCT/US2015/28995", Mailed Date: Aug. 26, 2015, 11 Pages.

U.S. Appl. No. 14/542,341, filed Nov. 14, 2014, Novak et al.

U.S. Appl. No. 61/988,786, filed May 5, 2014, Nystrom et al.

Berger, et al., "vTPM: Virtualizing the Trusted Platform Module", In Proceedings of the 15th Conference on USENIX Security Symposium—vol. 15, Article No. 21, Jul. 31, 2006, 16 pages.

"International Search Report and Written Opinion Issued in PCT Patent Application No. PCT/US2014/071773", Mailed Date: Mar. 23, 2015, 10 pages.

"International Preliminary Report on Patentability Issued in PCT Patent Application No. PCT/US2014/071773", Mailed Date: Nov. 19, 2015, 8 pages.

Aslam, et al., "Securely Launching Virtual Machines on Trustworthy Platforms in a Public Cloud—An Enterprise's Perspective", In

(56) References Cited

OTHER PUBLICATIONS

Proceedings of the 2nd International Conference on Cloud Computing and Services Science, Apr. 18, 2012, 10 pages.
Goyette, Rich, "A Review of vTPM: Virtualizing the Trusted Platform Module", In Proceedings of Network Security and Cryptography, Nov. 13, 2007, 4 pages.
"International Search Report & Written Opinion for PCT Patent Application No. PCT/US2015/028991", Mailed Date: Aug. 20, 2015, 9 pages.
U.S. Appl. No. 14/140,214, Feb. 12, 2016, Office Action.
"Second Written Opinion Issued in PCT Application No. PCT/US2015/28995", Mailed Date : Mar. 16, 2016, 5 Pages.
Office Action dated May 5, 2016 cited in U.S. Appl. No. 14/542,341.
"International Preliminary Report on Patentability Issued in PCT Application No. PCT/US2015/28991", Mailed Date: Apr. 4, 2016, 7 Pages.
Office Action dated Jun. 20, 2016 cited in U.S. Appl. No. 14/481,399.
International Search Report and Written Opinion for PCT Application No. PCT/US2015/058700, mailed Jul. 18, 2016.
Notice of Allowance dated Aug. 18, 2016 cited in U.S. Appl. No. 14/140,214.
Notice of Allowance dated Aug. 19, 2016 cited in U.S. Appl. No. 14/542,341.
International Preliminary Report on Patentability for PCT Application No. PCT/US2015/028995, mailed Aug. 4, 2016.
"Second Written Opinion issued in PCT Application No. PCT/US2015/058700", Mailed Date: Sep. 28, 2016, 6 Pages.
Notice of Allowance dated Jan. 5, 2017 cited in U.S. Appl. No. 14/481,399.

\* cited by examiner

SECURE MANAGEMENT OF OPERATIONS ON PROTECTED VIRTUAL MACHINES

CROSS-REFERENCE TO RELATED APPLICATIONS

This application claims the benefit of U.S. Provisional application 61/988,786 filed May 5, 2014, titled "SECURE MANAGEMENT OF OPERATIONS ON PROTECTED VIRTUAL MACHINES", which is incorporated herein by reference in its entirety.

BACKGROUND

Background and Relevant Art

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Corporate computing systems are under increasing risk of breach leading to monetary damages, leakage of intellectual property or sabotage. In particular, there can be threats to workloads in a datacenter, running in virtual machines, from the hosting fabric (the virtualization hosts, storage and networking systems) they run on and the management systems used to manage the fabric and the virtual machines.

This threat is relevant for tenants that operate their workloads at a public cloud or at a service provider: while the tenant may trust the service provider as an institution, it does not want to extend that trust to the staffers of the service provider, who may be malicious due to personal criminal initiative or having been bribed or recruited by external attackers, or whose credentials may have been stolen by an external attacker using one of many kinds of attacks including "phishing". But it is also relevant for internal operations of an enterprise: the enterprise's own IT staff may similarly have had their credentials stolen, or may be malicious for other reasons. In current practice, IT staff with privileges to operate the hosting fabric has broad and nearly unlimited access to all workloads.

These increased threats come at a time when modern cloud computing utilizes automation for lowered capital and operational costs and for large scale, high availability and geo-scale reach. But this automation and large scale also increases the risks, by allowing attackers to leverage the automation techniques and to hide their tracks among the large number of legitimate actions.

Thus, it may be useful to enable automated management workflows of both the virtualized workloads and the fabric, while protecting the workloads from the IT staff that operates the fabric. The challenge is that in current practice the virtual machine management systems (VMMs) play an active role in provisioning and managing virtual machines (VMs), and similarly the fabric management systems (FM) play an active role in provisioning and managing the fabric, but having either be part of the "trusted computing base", the foundation on which trusted computing is built, may be problematic for at least two reasons: management systems are large and complex and as such typically cannot be made or proven to be secure, and the tenant does not want to extend trust to the service provider's operations staff that runs the VMM and the FM.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for deploying an encrypted entity on a trusted entity is illustrated herein. A method includes, at a trusted entity, wherein the trusted entity is trusted by an authority as a result of providing a verifiable indication of certain characteristics of the trusted entity meeting certain requirements, receiving an encrypted entity from an untrusted entity. The untrusted entity is not trusted by the authority. At the trusted entity, a trust credential from the authority is used to obtain a key from a key distribution service. The key distribution service may be part of the authority or may trust the authority. The key is used to decrypt the encrypted entity to allow the encrypted entity to be deployed at the trusted entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments of the present invention may implement a pattern used to automate management operations on virtual machines (VMs), such as deployment and migration. In particular, embodiments may determine that a host meets certain policy requirements. When the host meets the certain policy requirements, a certificate can be issued to the host, which the host can use for performing various deployment activities. In particular, at least one of the requirements may be that the host contains a trusted execution environment (TEE). Various different TEEs may be jointly or alternatively be used. In one embodiment, this could be implemented as functions running in the kernel of the host VM. In another implementation it could be running in the hypervisor. In other embodiments it could be implemented as a separate address space enforced by the hypervisor using memory mapping capabilities of the processor. In other embodiments it could be implemented as a separate execution area enforced by the processor (such as the TrustZone of the ARM architecture, the emerging SGX capability described by Intel Corporation of Santa Clara, Calif., or Trusted Platform Module (TPM) technology). These different implementations can offer similar functionality, such as the capability to do cryptographic operations, store credentials, validate the integrity of code or data, and protect secrets. However, they may differ in the security properties they offer. Some embodiments may contain a trusted execution environment (TEE) by using functionality referred to herein as virtual secure mode (VSM) which is described in more detail below.

The pattern illustrated above can be generalized to many other scenarios that depend on secure deployment or configuration or migration, such as configuring IPsec for secure networking, running workloads in lightweight containers smaller than VMs, etc.

Details are now illustrated with reference to the Figures.

Figure 1:
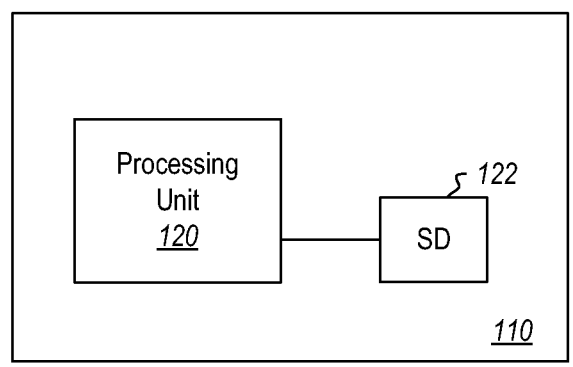
FIG. 1 illustrates a processing unit coupled to a security device.

In FIG. 1, a processing unit 120 may be connected to a hardware security device 122. The security device 122 may be able to generate and securely store cryptographic keys that may be used to secure various aspects of the computer 110. In one embodiment, the security device 122 may comprise a Trusted Platform Module (TPM) security device, or the like.

Throughout this document, the term trusted platform module (TPM) is frequently used. TPMs are well understood by those skilled in the art. The use of the term TPM, however, is not intended to limit aspects of the subject matter described herein solely to devices that comply with one or more versions of standards for implementing TPMs. Instead, this term is used as one example of a security component that may be used in accordance with aspects of the subject matter described herein.

In other implementations, other security components that provide security functionality may also be used without departing from the spirit or scope of aspects of the subject matter described herein. Various security devices may have characteristics such as the following:

1. Protected memory (referred to as "shielded locations" in many TPM applications). A security device may include memory to which only the security device may write. This memory may be used to store measurements, to seal and unseal, for other cryptographic functions, and for various other functions.

2. A means for identifying the security device and providing encrypted storage that no other device can decrypt. For example, a security device may include a secret that only the device knows and that distinguishes the device from other devices.

3. A means for performing attestation. The security device may have a processor or other circuitry that may be used to create trusted messages about any asset controlled by the security device. Some exemplary assets controlled by the security device may include a cryptographic object, a sealed blob, a state of a platform with which the security device is associated, or the like Although security devices are often thought of as separate discrete components, this is not required. For example, in one implementation, firmware coupled with a processor may be used as a security device.

When the term TPM is used herein, it is to be understood that alternative implementations of other security devices (including those mentioned herein in the specification) may be used without departing from the spirit or scope of aspects of the subject matter described herein.

Figure 2:
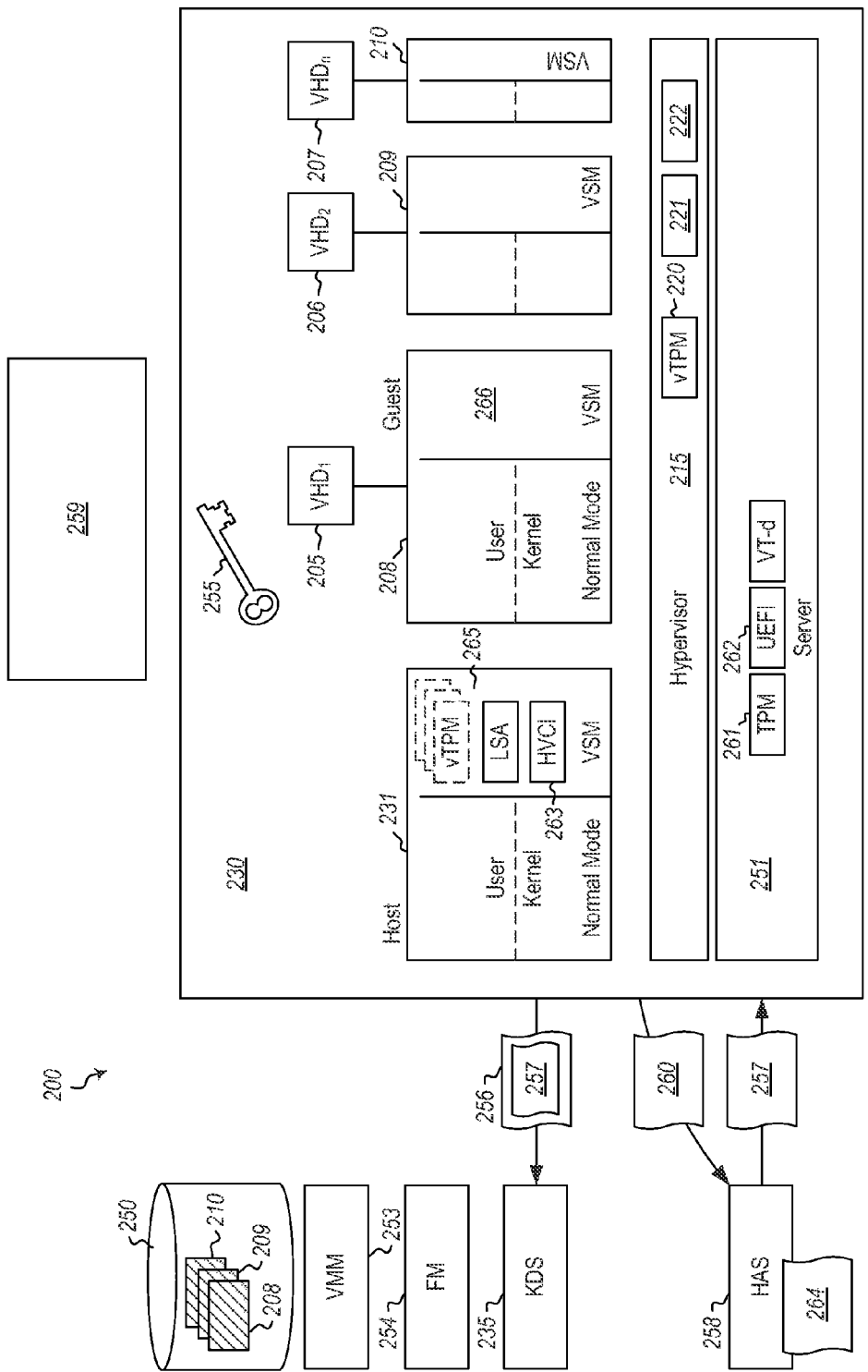
FIG. 2 is a block diagram that generally represents exemplary components of a system configured in accordance with aspects of the subject matter described herein.

With a virtual machine, a user may want to have assurances regarding the integrity of the virtual machine and the hosting environment. FIG. 2 is a block diagram that generally represents exemplary components of a system configured in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the system 200 may include a host 230, a key distribution service 235, and other components (not shown). The host 230 may be suitable for hosting the one or more virtual machines 208-210 that may be associated with the VHDs 205-207. The host 230 may host one or more virtual machines (e.g., the guest virtual machines 208-210). A virtual machine may be associated with one or more VHDs (e.g., one or more of the VHDs 205-207). The guest virtual machines 208-210 may migrate between hosts in contrast to a "root" VM 231 which provides the operating system functionality to the host 230. The host 230 may include a hypervisor 215 and a discrete trusted platform module 261 or other security device.

The hypervisor 215 is a component that creates a virtual environment in which the virtual machines 208-210 and the root VM 231 may operate. The hypervisor 215 may be implemented in software, firmware, hardware, a combination of two or more of the above, or the like. The hypervisor 215 may execute directly on the host 230's hardware or may execute within an operating system environment hosted on the host 230.

In one implementation, the hypervisor 215 may manage one or more virtual TPMs (vTPMs) 220-222. Each vTPM may be associated with a virtual machine (e.g., one of the virtual machines 208-210). In this implementation, the hypervisor 215 may store data representing the vTPMs in a secure memory of the hypervisor 215 that is not available to components outside of the hypervisor 215. To gain access to a vTPM, an attacker may be required to gain control of the hypervisor 215 itself. In another implementation, the host 230 may manage the vTPMs 220-222. In this implementation, users and processes with administrator privileges may have access to the vTPMs 220-222. In yet another implementation, a service external to the host 230 may manage the vTPMs 220-222. In yet another implementation, as illustrated by the vTPMs shown in phantom in FIG. 2, the vTPMs may be implemented in the VSM 265 of the root VM 231.

In one implementation, the key distribution service 235 may be hosted external to the host 230.

Keys usable to decrypt a vTPM may be distributed in a variety of ways. For example, in one implementation, a key may be distributed any time after it is known that the state(s) of the host satisfy policy. For example, after configuring the host 230 in a state that satisfies policy, the state of one or more registers of the TPM may be signed by the TPM 261 and sent to the key distribution service 235. After receiving this, the key distribution service 235 may immediately or any time thereafter send the host 230 a key encrypted or wrapped in such a way that the host 230 may only decrypt the key when the host 230 is in a state that satisfies the policy. Encrypting the key in this manner may involve encrypting the key with a public key of a host's TPM as well as sealing to a state that satisfies policy (as measured by the host's TPM).

In another implementation, the key distribution service 235 may wait until a key is requested before providing the key. In this implementation, the key distribution service 235 may verify the state of the requesting machine prior to providing a key. If the key satisfies policy, the key may be provided by the key distribution service 235. Otherwise, the key distribution service 235 may withhold the key from the requestor.

The examples of key distribution above are exemplary only. Based on the teachings herein, those skilled in the art may recognize other ways of distributing keys that may also be used without departing from the spirit or scope of aspects of the subject matter described herein.

The teachings above may be applied to secure machines that either do not have a security device or that have an older version of a security device. For example, some machines may not have a TPM at all. Other machines may have a TPM, but the TPM may be implemented according to an old TPM standard. Some operating systems may not execute unless they have access to a TPM implemented according to a certain version or greater.

To remedy such platforms as the ones described above, the platform may be configured with a hypervisor. The hypervisor may then be used to execute an operating system in a virtual environment. When the operating system requests access to a TPM, the hypervisor may supply a virtual TPM of the appropriate version. The hypervisor may secure the virtual TPM so only the hypervisor may change the protected memory of the virtual TPM. As far as the operating system is concerned, the virtual TPM looks just like a discrete physical TPM.

Furthermore, the seeding secret used to create the virtual TPM may be entered via a keyboard or other input device, read from a USB or other external-storage device that is disconnected after the seeding secret is used, or the like.

One advantage of the above method for securing machines is that fast hardware of the machine (e.g., a CPU) may be used to perform the functions of the vTPM. This may greatly speed cryptographic functions of the machine.

Where an older-version TPM is available on a machine, this older-version TPM may be used to provide evidence that the machine is in a state in which the machine is allowed to gain access to a vTPM key. Although this may not be as ideal as having a new-version TPM on the machine and using this new-version TPM to gain access to a vTPM key, it may be better than non-TPM solutions.

Consider now an initial situation with a set of VMs 208, 209 and 210 and already existing in the datacenter environment. The keys for the encryption are protected by virtual trusted platform modules (vTPMs) 220, 221 and 222 respectively.

The virtual machines 208-210 may be provided via the datacenter to one or more tenants. A tenant may be associated with one or more of the virtual machines 208-210. The shielded VMs are stored in the datacenter's storage system 250, but under the threat model considered here a tenant does not trust the access control mechanism of the storage system 250, since a service provider staff member with administrator privileges can bypass those controls.

A tenant may include a user, company, or other entity that has rights to access one or more of the virtual machines. The "tenants" in a multi-tenant environment may be the separate enterprises, as normally assumed for VMs. But they may also be departments within an enterprise, or users, or separate applications—any kind of grouping that should be kept apart from other groupings. In some cases, an enterprise may manage the weaker isolation of such containers by allowing the operation of users, departments and applications within the enterprise, but using the stronger VM isolation to protect from other, potentially hostile entities.

In one scenario, the VMs 208, 209 and 210 are deployed onto one of the hosts 230 in the fabric. In the embodiments illustrated herein, a "host" is a virtualization platform. The host, in some examples illustrated, includes the hypervisor 215 deployed on hardware (illustrated as server 251) plus a host VM 231 which is deployed on the hypervisor 215. However, it should be appreciated that hosts can be implemented in other ways as well. For example, sometimes a host can be implemented in the hypervisor 215 with no host VM. Thus, a "host" as used herein, simply refers to a virtualization platform, in whatever form that may be constructed. The deployment action may be undertaken by the tenant using a self-service management portal presented by a VMM 253, or by the tenant acting through a programming interface, or by another interface. In another variant of the scenario, the action may be undertaken by an automated function of the VMM 253, such as deployment on a tenant-specified schedule or as a failover operation in response to a host failure. In another variant of the scenario, the action may be undertaken by the operations staff of the service provider, to facilitate operational tasks such as host servicing or resource allocation. The protection of the VMs 208, 209 and 210 is not based on trust in the identity of the actor originating the action, because the system permits actions by the service provider's operations staff or by an automated FM 254, and even in the case of action initiated by the tenant there is the possibility of a malicious staffer intercepting and compromising or faking such an action.

Once a shielded VM is deployed on the host the host decrypts it, as illustrated by the non-crosshatched version of the VMs 208, 209 and 210 illustrated in FIG. 2. In a typical scenario, the VM's Virtual Hard Drive (VHD) is encrypted, for example using Microsoft's BitLocker mechanism available from Microsoft Corporation of Redmond, Wash., and has its encryption key protected, as discussed generally above, by a virtual TPM (e.g. vTPMs 220, 221, and 222), in much the same way an encrypted physical hard drive has its key protected by a physical TPM. In the physical case, the hard drive and the physical TPM both belong to the same physical computer and are statically enabled and mutually trusting by virtue of their physical co-location on the physical machine, but in the case of a virtual machine that may be deployed on any physical machine, the virtual TPM is a software+data construct that is itself encrypted. So decrypting the shielded VM starts with the host 230 decrypting the vTPMs 220, 221 and 222, and from there a guest VM extending measurements into a vTPM to retrieve the keys to begin the data decryption process. In order to do that, the host needs to retrieve the key to unlock the vTPMs 220, 221 and 222. In this case that the host decrypts the shielded vTPM data to enable the vTPM to execute. The VM's TPM (the vTPM exposed from the host) is used by code inside the VM to decrypt the data.

The term "virtual hard drive" as used herein is exemplary only. In other alternatives, other virtual storage devices such as a virtual floppy, virtual solid state storage, or other virtual read-write media, a virtual CD ROM, DVD, or other virtual media may be substituted without departing from the spirit or scope of aspects of the subject matter described herein. The term virtual storage device is intended to cover any type of virtual storage device including, for example, the ones mentioned above.

A virtual storage device may include or be associated with metadata that is meant for use by a hypervisor 215. In some implementation (described in more detail below), this metadata may be hidden and not viewable by a virtual machine hosted by the hypervisor 215. This view excludes the metadata meant for use by the hypervisor 215. In these implementations, the virtual machine, using the vTPM, may only encrypt or decrypt what is in the view.

In other implementations (described in more detail below) where there are no vTPMs, an entire virtual storage device including the metadata meant for use by the hypervisor may be encrypted. In these implementations, after obtaining a key from a key distribution service, the hypervisor may decrypt the entire virtual storage device including the metadata meant for use by the hypervisor.

Returning to FIG. 2, the system 200 may be hosted in a public or private cloud. The cloud is a term that draws on the idea that computation, software, data access, storage, and other resources may be provided by entities connected to some network without requiring users to know the location or other details about the computing infrastructure that delivers those resources.

The tenant may not want other tenants, the cloud hosting operator, attackers, or other entities to gain access to the tenant's virtual machines. The tenant may also want assurances from the cloud hosting operator that the host hosting a virtual machine of the tenant satisfies certain policies (e.g., that the host's configuration is in a set of one or more states defined by the tenant).

To ensure that the policies are met, in one implementation, the tenant may require that all or portions of the virtual hard drives 205, 206 and 207 associated with the virtual machines 208, 209 and 210 respectively are encrypted with a secret key. An encrypted virtual hard drive may only be unencrypted if the secret key is known. Without its associated virtual hard drive, a virtual machine may not be able to be executed.

With respect to policy and policies, it is to be understood that the operations herein may be applied to one or multiple policies irrespective of whether the term policy or the term policies is used. For example, a sealed key may be unsealed if a host complies with any one of a set of acceptable policies (or in some cases when the host complies with all, or certain subsets of policies). Likewise, a key distribution service may provide a key for accessing a vTPM if a hypervisor provides evidence that a host state satisfies any one of a set of acceptable policies (or when the host state satisfies all or certain subsets of policies). For example, a hypervisor may provide this evidence by providing an attestation of the host state by a TPM of the host. In some embodiments, one such policy that may be implemented is a policy specifying that a host makes certain certificate requests using a secure subsystem of the host, such as VSM 265, or that the host is able to perform processing using the secure subsystem of the host. As noted, detailed information regarding VSM is included below.

In one implementation, the secret key that may be used to decrypt a VHD may be the same key that is provided by the key distribution service 235. In this implementation, the vTPMs 220-222 may not be needed. Once the secret key is obtained from the key distribution service 235, this key may be used to decrypt a VHD.

In another implementation, the secret key that can decrypt a VHD of a virtual machine may be sealed to a vTPM that is associated with the virtual machine. The sealing may involve one or more registers of the vTPM. The set of registers may be chosen so as to enforce a tenant-selected policy. When a key is sealed via a vTPM, the key may only be obtained from the vTPM if the register(s) used to seal the key include the same data they did when the key was sealed.

Furthermore, the vTPM may be protected in such a manner that only a host in possession of the correct key k for the vTPM will be able to access it. The vTPM may be protected with a key k, and the KDS can send the key k to the host inside a sealed blob. The sealed blob can be constructed in such a manner that the TPM will only decrypt it if a selected set of PCR registers have desired values. In one implementation, the KDS uses the standardized TPM formats to achieve this, and the host uses the TPM to decrypt the key k using the TPM's unseal operation.

The unseal operation may be performed by the host 230 based on key distribution as described below. If the unseal operation is performed by the distribution service 235, the host may pass the key distribution service 235 the data measured by the TPM 261 in a package signed by the TPM. If the unseal operation is performed by the host 230, the host may use a previously distributed key that may only be unsealed on the host 230 if the host 230 is in a state (as measured by the TPM 261) that satisfies policy.

If all the registers are in the correct state (meaning that the host 230 is in a state compliant with the policy), the unseal will succeed and the host 230 will be provided with a key to decrypt the virtual machine's vTPM or a key to decrypt VHD(s) directly. At this point the virtual machine may boot, since the vTPM is available to unseal the key necessary to decrypt the VHD(s) of the virtual machine. If the vTPM state after boot is in accordance with the tenant's policy, an unlock will occur. As the virtual machine unlocks, it may also seek to do an attestation based on its current vTPM state. This attestation allows the virtual machine to demonstrate its compliance to tenant policies to other tenant resources.

At this point, the following objectives have been achieved:

1. Through the attestation done by executing the virtual machine, the tenant is assured that the virtual machine is in compliance with tenant-set virtual machine policies;

2. Because of the sealing of the key that encrypts VHD(s) of the virtual machine, the tenant is assured that the VHD content has not been modified; and 3. Because of the host TPM and attestation of host, the tenant is assured that the virtual machine is running on a host that is in compliance with set policies for hosts.

To also protect against modification of a VM's components (e.g. VHD, device state, VM memory, etc.) during runtime, a code integrity policy may be implemented on the host.

In an alternative implementation, instead of a key distribution service 235 performing a seal operation, the key distribution service 235 may simply provide a key to decrypt a VHD. For example, the host 230 may pass the key distribution service 235 the data measured by the TPM 261 in a package signed by the TPM and the key distribution service 235 may respond by providing the host with a key to decrypt a VHD.

In one implementation, the key distribution service 235 may be controlled by the tenant. In another implementation, the key distribution service 235 may be controlled by the hoster (e.g., a cloud operator that operates the host 230). In the first implementation, the tenant maintains complete control over the keys necessary to decrypt a vTPM (and through it, a virtual machine), but may need to bear the burden of maintaining a connection to the hoster in order to allow virtual machines to boot. In the second implementation, the tenant may let the hoster (e.g., a separate part of the hoster's organization) run the key distribution service 235. In one implementation, this may be done such that at least two entities in the hoster's organization are required to cooperate in order to access a tenant vTPM key k.

Because of the circumstances that prevent putting trust in the VMM 253 or its operations staff, the VMM 253, in typical embodiments, does not have a security-critical role in providing the keys to unlock the shielded VMs 208, 209 and 210. But it is very useful for automated and efficient operations, and to enable self-service operations for the tenant, that the VMM 253 can orchestrate the operations. One pattern of some embodiments of the invention that combines these requirements looks like this:

1. The VMM 253 deploys a guest VM (e.g. VM 208) to an appropriate host 230, in a conventional way, without doing anything security-critical with regard to deploying keys. The VMM 253 can perform its normal management operations with normal considerations and actions, such as scheduling, optimization of placement and resource allocation, without significant change due to the protected nature of the VM 208 (some minor extensions are discussed below). The VM 208 contains, as part of its metadata, the encrypted vTPM 220, as well as the protection key 255 for the vTPM 220 encrypted as required for the secure operations, but all this metadata is handled together as part of the standard deployment operations without special security-related handling by the VMM.

2. When the host 230 detects that this is a shielded VM (not all VMs are shielded), it reaches out to the KDS 235 to retrieve the key to unlock the vTPM 220. As part of this request 256, the host includes an attestation certificate 257, provided by the host attestation service (HAS) 258 showing that it is a valid host that is compliant with the service provider's policy. For example, the host may provide a host attestation certificate indicating that the host requested the certificate using a secure subsystem of the host. The KDS 235 verifies that the attestation certificate 257 meets policy requirements. It then decrypts the vTPM master key, which is encrypted with the key of the KDS, and re-encrypts it to one or more public keys of the host, and transfers it securely to the appropriate security software on the host. This can be the public key of the host, or a TEE inside the host. The host uses the delivered vTPM master key to unlock the vTPM, and provides the vTPM as a service to the guest VM, which can retrieve from the vTPM the keys necessary to begin the decryption process of the shielded VM 208. A cryptographically trustworthy message is sent by the security infrastructure confirming the success or failure of the operation. None of these steps involve the VMM 253.

3. At the end of the security-critical process that decrypts the VM 208, the VMM 253 continues with normal deployment and configuration operations. The VMM 253 is notified of the success or failure of the operation, which is valuable information for normal operations and is handled by the VMM 253 as all other notifications, but since the VMM 253 is not trustworthy a cautious tenant would also confirm the receipt of the secure message.

As is apparent from this description, the VMM 253 does not participate in the security-critical operations such as host attestation and key distribution. The VMM 253 provides automated orchestration, but the security is protected by the security infrastructure and is not vulnerable to the operations of the VMM 253.

Under some embodiments of the present invention, the pattern of management and automation being separated from, but cooperative with, security-critical functions can also be applied to other VM operations than deployment, and to operations that do not apply to VMs. It can also be applied to managing the "fabric", the set of servers, storage, network and management systems on which the VMs run.

Application of the Pattern to other VM Operations

During the lifecycle of a VM 208, the VMM 253 orchestrates many operations beyond deployment. The same trust relationships, and the same pattern of operation and key management, applies across all these scenarios, with occasional special considerations.

Migration of a VM from a Host to Storage

This scenario is the inverse of the deployment scenario described above. One pattern of some embodiments of the invention that combines these requirements might be implemented as follows:

1. The VMM 253 makes conventional decisions and sends conventional instructions to the host VM 231 to pause or shut down the VM 208.

2. The host 230 does what is required to protect the VM 208 during this operation. This may include encrypting other VM artifacts such metadata describing the VM 208, and processor state and contents of memory and virtual memory files, and the same key transfer mechanism is used for these other artifacts. For details on one example of how this may be accomplished, see the section titled "Virtual Machine Assurances" below.

3. When this protection process is completed, the host 230 pauses or shuts down the VM 208 with all its data encrypted and the necessary keys protected by the vTPM 220 which is in turn encrypted and protected, the VMM 253 proceeds with the normal storage process and normal management of the stored contents. For example, the VMM 253 may cause the shielded VM 208 to be stored to the storage system 250.

Just as in the VM deployment process, the VMM 253 is entirely out of the security-critical operations: not only does the VMM 253 not participate in the encryption process and the key exchange, the data it stores is protected with encryption, and it does not participate in testifying to the successful protection of the VM 208.

Migration of a VM to another Host

Modern virtualization platforms support several forms of migration of a VM from one host to another: live migration maintains the execution of the VM without interruption. Non-live migration involves a service interruption but has less stringent environmental requirements. Such migration can be done in different ways based on the nature of the virtualization platform and the storage and network systems. The VMM 253 understands the forms of migration that can be done in a given fabric, and knows how to initiate and orchestrate such actions. For migration of shielded VMs, one pattern of some embodiments of the invention that combines these requirements looks like this:

1. The VMM 253 makes conventional decisions about the type and destination of the migration, and then instructs the source host 230 to initiate a migration to the chosen target host 259.

2. The source host 230 engages in a secure conversation with the KDS 235 to initiate encryption of the VM 208 and its vTPM 220 and the requisite key exchange, and the target host 259 makes a secure request to the KDS 235 for the keys to unlock the vTPM 220 of the VM 208. The VHD 208 takes care of encrypting not only the VHD 205 itself, but can ensure that other VM artifacts such as the memory state of the running process and page files, and the same key transfer mechanism may be used for these other artifacts, such as metadata describing the VM, and processor state and contents of memory and virtual memory files, and the same key transfer mechanism is used for these other artifacts.

3. Once there is key agreement the hosts 230 and 259 signal that they are ready to proceed with the migration and the VMM 253 sends conventional commands to the hosts 230 and 259 for the type of migration that is to be done. In some embodiments, the VMM 253 gives instructions to the originating host and that host takes care of the rest, such that the VMM is not involved in minutiae of migration—but can double check with migration code owners. While the preceding implies a step-by-step process, in some migration techniques, such as live migration, the encryption and the migration operate together, encrypting things incrementally. Thus, the operations may not be divided into separate steps running sequentially as described here. For example, the operations may be interleaved so that encryption and migration are done for segments of the operation as required by the migration procedure using standard procedures well known to practitioners of the arts. Thus, various alternatives may be implanted to achieve the migration within the scope of embodiments of the invention.

As above, there is minimal change to the VMM orchestration, and the VMM 253 does not participate in any security critical workflows. Secure notification of success or failure is done by the secure infrastructure, while the VMM 253 gets conventional notifications and responds to them in a conventional way.

Failover within a Cluster

A special case of migration is failover within a cluster. Both storage and management are configured to allow the service to rapidly switch over traffic to healthy systems when one component fails. There are many forms of clustering well known within the industry.

If the VMs making up the application cluster are shielded, then the keys are available on the target system when the failover occurs. If all the systems are active, the keys are provisioned to the hosts at the time of the original deployment, and no special processing is required during a failover. But in an active-passive configuration, several options are available. For example, it is possible to treat such a failover as a migration, with the target host 259 making the same kind of key delivery request as discussed above, but introducing activities such as key distribution at the time of failover could reduce availability and responsiveness. In some implementations, the keys are provisioned together with the VMs to all the relevant hosts in the cluster, active or not, using the deployment process discussed above. This allows cluster management software to perform the failover operation using normal management or control techniques, with or without involvement by the VMM 253, without affecting how VM protection is done. This arrangement protects the VMs from both the VMM 253 and the cluster management software, in the same way as in the deployment and migration scenarios described above.

Migration to another Datacenter

Migration to another datacenter may occur because the tenant wants to move elsewhere for business or compliance reasons, or for purposes of business continuity or disaster recovery. The process is done by the VMM 253 or other management systems in the same way they would in a conventional case, but the requirements for secure key exchange from one datacenter to the other may be more complicated than in the migration case above.

- If the two datacenters share secure hosting services such as HAS 258 and KDS 235, the cross-datacenter migration combines the management and security operations in the same way as in the migration case above, although the physical migration of artifacts may use other techniques as is commonly used for long-distance transfers.
- If the two datacenters have separate secure hosting services the two services use a trusted mechanism to do the key exchange. One solution is to establish a federation or other trust relationship between the secure hosting services to allow them to directly make the key exchange, in some cases leveraging industry standard protocols.
- If the two secure hosting services do not have a trust relationship, the tenant or a supporting service retrieves the VM 208 and its corresponding keys, and transfer them to the target datacenter in a process similar to the way the initial VM was transferred to the datacenter as described below.

Rather than focusing on whether the migration occurs between two separate datacenter buildings or what the physical distance is, embodiments may focus on whether the source and target hosts share a secure hosting service, or have separate secure hosting services with an established trust relationship, or have separate hosting services without such a trust relationship. Examples of all these variants could exist between sections within a single datacenter, among datacenters run by a single service provider, among multiple service providers, or between the tenant and the service provider. In all these cases, the illustrated patterns of embodiments of the present invention describing the separate-but-cooperating relationship between the VMM 253 and the secure hosting services remains valid, only the details of the key exchange and the physical transfer differ.

The Tenant Creating Shielded VMs Based on Private Artifacts

A tenant can create a shielded VM from ordinary unprotected artifacts, but it is useful for the tenant to be able to protect the artifacts from the beginning by going through a suitable VM creation process in a private computing environment and encrypting the VM and its VHD using standard tools, such as Microsoft BitLocker, within this private environment. These protected artifacts can then be transferred to the service provider's datacenter and stored on a VM storage library using conventional file transfer mechanisms, and started as a VM using the VMM 253. To allow the shielded VM to be started, the tenant's protection key is transferred to the service provider and provisioned to the KDS 235. In one embodiment, the tenant is provided with the service provider's KDS public key during an account provisioning process or at another suitable time, using a secure transfer. The VM protection key is stored within the protected storage hierarchy of a vTPM, which is in turn protected with the KDS public key. After transfer to the service provider, this shielded VM package, thus protected, can be decrypted by the KDS and thenceforth processed using the techniques described herein.

The Tenant Creating Shielded VMs Based on Templates

In cloud computing it is common that the service provider offers a gallery of templates provided by the service provider, independent software vendors (ISVs), systems integrators or other third-party providers. Such a template is a complete or partial definition of a VM that is not yet tailored to the tenant's requirements and not yet provisioned with account identification, administrator passwords, software or other sensitive data. Such generalization of a system and its subsequent specialization may be done with Microsoft's sysprep utility, or other appropriate utility, in combination with other tools, such as a boot manager.

It is useful for the tenant to be able to create shielded VMs from such a template. When doing this, it is useful for the tenant to be able to verify the integrity of the template, such as verifying that the template has not be tampered with by a service provider staff member inserting malware or configurations that would allow subsequent attack on the VM. The integrity of the VHD and other VM artifacts can be verified, for example, through digital signing, and the tenant can specify, in the request to create the shielded VM, a trusted means of verifying the integrity of the VM components.

In other scenarios, the template may contain secrets such as software, data or credentials for connecting to external services, and it is useful to protect the template through encryption. But since this encryption is done with a key that belongs to the author of the template, the virtual storage device is re-keyed (e.g., decrypted and re-encrypted with a different key) with a key that is specific to the VM and, consequently to the tenant. This decryption and re-encryption with a different key may be replaced with other re-keying scenarios, such as using hardware support for changing a key without a full decrypt/re-encryption.

In the process of validating the template resources and creating a shielded VM, or of decrypting and re-encrypting the template VHD to create a VM VHD, the information is processed in one continuous stream and is not at any time stored in unencrypted form. This process is performed by a secure process which operates on some system within the datacenter. In one embodiment, the secure process operates on the virtualization hosts, and in some embodiments, this may occur within the shielded VM itself.

When creating shielded VMs from a template it is common that each VM is protected by a unique key, but the validation-and-encryption or re-encryption steps take a certain amount of time and it may be useful for creation of large-scale applications to avoid this delay for each of the VMs, especially during automatic provisioning of VMs in response to increased load. To protect the VMs from other tenants and the service provider but avoid the delay for each VM, the validation-and-encryption or validation-and-re-encryption step can be performed, without the template specialization, to create a template that is encrypted with a tenant-specific key, allowing shielded VMs to be created from this template without the time-consuming cryptographic tasks for each shielded VM.

To protect this VM and any secrets that the tenant injects into the VM from the service provider staff, the relationship between the VMM and the secure infrastructure follows the pattern used elsewhere in embodiments of the invention: the tenant creates a task definition that includes information necessary for the creation and protects this task definition through digital signing, encryption or a combination of signing and encryption, and this protected task definition is transferred to the VMM 253 which is unable to decrypt or alter it, and the protected task definition is transferred to the secure process which requests from the KDS 235 the key to unlock the task definition in the manner used elsewhere in embodiments of the invention, and the central validation-and-encryption or decryption-and-encryption task is performed by the secure process as an atomic task that cannot be interrupted or modified by the VMM 253. The VMM 253 does other useful tasks before and after the secure creation in the conventional way, such as verifying and charging the tenant's account, storing the shielded VM, deploying the VM, and notifying the tenant of the results of the operation. The message that confirms the completion of the task is trustworthy because it contains information that is known only to the secure process and is digitally signed by the secure process using a certificate that is rooted in the service provider's private key, and thus proof from tampering by the service provider's staff.

The tenant may want to deploy and retrieve the shielded VM for execution in a private cloud or at another service provider. If the tenant has a datacenter with a similar hosting fabric for protecting VMs with secure hosting services, an inter-datacenter transfer as described above can be used. If the service provider and tenant have established a trust relationship, the transfer can proceed as described above. If they do not, the tenant can request that the VM is encrypted in the normal way and the vTPM master key is encrypted to a key belonging to the tenant. this allows the VM to be transferred with conventional data transfer mechanisms and opened by the tenant. This approach is implemented where the association between the VM and the tenant's public key is secure and tamper-proof, to prevent an attacker from pretending to be the tenant, substituting another public key and retrieving the vTPM master key. Several known techniques exist for cryptographically protecting this association: the tenant's public key can be included within the VM metadata that is encrypted and protected by the vTPM, and hence accessible to the KDS or an approved host but not to an attacker, alternatively, the tenant ID may be protected in such a way, and a lookup table is available to the KDS to identify the tenant's public key from the tenant ID. In one implementation the VM metadata includes the vTPM master key encrypted to the tenant's public key, which allows the VM to be transferred to the tenant using simple data transfer mechanisms without involvement of the KDS or other security-related services.

Embodiments of the present invention separate the management and security operations in such a way that conventional transfer techniques can be used, orchestrated by the VMM or with other tools, even including physical transfer of storage media, while the VM contents and keys are protected by the security mechanism.

Supporting Techniques

Embodiments implement, for operation, a number of supporting activities, both to facilitate automation and to form a secure foundation. Some embodiments of the invention also include several supporting activities to aid the service provider and the tenant in the disciplined processes required for effective protection.
Provisioning, Configuration and Attestation of the Hosts The security of the VMs depends on the integrity of the host, which should be running only the correct software with no malware such as "root kits" and no old versions of software with vulnerabilities, and should have correct configuration settings and correct policies. These hosts are typically provisioned and configured with conventional fabric management systems (such as FM 254), and under the threat model of some embodiments of the present invention the FM 254 is not a part of the trusted computing base, for the same reasons as discussed for the VMM 253: the FM 254 is a large and complex system, and the tenant does not want to extend trust to the staff operating the FM 254. Some embodiments of the present invention do not require replacing the existing FM 254 with special tools or techniques— such a change might be onerous for the service provider's IT staff which has existing processes based on existing tools, and in any case it would be challenging to prevent use of the plethora of existing tools and interfaces. Because of this, some embodiments of the present invention are not based on trying to prevent misconfiguration or compromise. Rather, these embodiments are based on detecting a misconfigured or compromised host, on excluding such a misconfigured or compromised host from participating in the hosting fabric, and on confirming successful and uncompromised operations.

When the host 230 receives a shielded VM 208 and makes a request 256 to the KDS 235 to retrieve the vTPM key, it includes an attestation certificate 257 to demonstrate that it complies with certain polices. For example, the attestation certificate may indicate that the host 230 that it is a known member of the fabric, and that it is running the correct software, and that correct security-relevant policies are in effect. A system generally does not reliably attest to its own health. To get this attestation certificate, the host 230 makes a request 260 to a host attestation service (HAS). This request can include several pieces of information that are relevant to the trust in integrity of the host. In one implementation, the request includes information such as one or more of:

A key that derives from the physical Trusted Platform Module (TPM) 261 of the host 230, such as an Endorsement Key. This key is compared with a list of known server keys, which was provisioned when the server 251 was delivered to the datacenter. The list of server keys is provided in a manifest that is delivered securely, in parallel with the server delivery. Alternative methods of identification are possible.

Measurements of the software included in the boot process, as provided by a unified extensible firmware interface (UEFI) module 262, or other boot software, and signed by the TPM 261.

A certificate that identifies that the request originates from a secure software subsystem of the host. Several ways of implementing such secure subsystems are known to practitioners of the art. In one embodiment, this subsystem could be implemented as functions running in the kernel of the host VM. In another implementation it could be running in the hypervisor. In other embodiments it could be implemented as a separate address space enforced by the hypervisor using memory mapping capabilities of the processor. In other embodiments it could be implemented as a separate execution area enforced by the processor (such as the TrustZone of the ARM architecture or the emerging SGX capability described by Intel). These different implementations can offer similar functionality, such as the capability to do cryptographic operations, store credentials, validate the integrity of code or data, and protect secrets in a way similar to the vTPM. they may differ in the strength of the security they offer. Embodiments of the present invention can operate equivalently over the various implementations, since embodiments of the invention depend on the functionality, not the security strength.

The signing certificate of the code integrity policies of the host, including Hypervisor Enforced Code Integrity (HCVI) 263 and AppLocker (these protect the VM from intrusion by the host). Alternatively, embodiments may recognize other virtualization arrangements that do not have a host VM. For example, HVCI and AppLocker (from Microsoft Corporation of Redmond Wash.) are examples of code integrity validation for the host. Other alternatives may alternatively be used.

The public key of the secure software component to allow the HAS 258 to establish secure communication with the host.

In other implementations or configurations, some of this information may be omitted, for example if an enterprise is convinced their datacenter is secure and has strong processes in place to prevent compromise. Indeed, all of it may be omitted and embodiments of the invention can operate without the attestation step. The requirements for attestation in a particular datacenter are defined by an attestation policy.

In other embodiments, other information could be added to support other policies, such verifiable proof of the geographical location of the host for compliance with data sovereignty regulations, or verifiable proof of the placement of the host within a locked cage within the datacenter, or verifiable identification of components in the physical server and their supply chain provenance, or verifiable confirmation that a host is connected to a secure network. Industry and government organizations implement techniques for providing such information in a cryptographically robust way and if such information is available on the hosts it can be used in the attestation step. Alternatively, the service provider may place statements asserting to information of this type, digitally signed with the service provider's public certificate, or signed with a certificate that is cryptographically based on the TPM key, or both, such a statement may be sufficient for regulatory compliance even though not technically strong.

The HAS 258 compares this information with the specifications in the attestation policy 264, and if it matches the policy 264, returns an attestation certificate 257 signed by the HAS 258. If the host information is not compliant with the policy 264, and thus if the host is misconfigured or compromised, the attestation service detects this and refuses to provide an attestation certificate 257, which means that the host 230 does not receive the key 255 to unlock the vTPM 220 and thence the VM 208.

Thus, embodiments of the present invention allow standard FM tooling to provision and configure the hosts. The integrity of the hosts is monitored by the HAS 258 and confirmed by an attestation certificate 257. This attestation certificate 257 is used by the KDS 235 to enable deployment and migration of shielded VMs under the control of the VMM 253, and both the VMM 253 and the FM 254 are notified of success and failure and handle these outcomes according to standard management policies and procedures, for example responding to a host attestation failure by placing the VM 208 on another host that complies with the policy 264.

The FM 254 and the VMM 253 can take other actions for isolation or remediation of the host 230 upon discovery of the attestation failure and possible compromise. For example, the service provider may have a policy to decide what to do with a known host that was expected to pass attestation but later fails attestation: a cautious approach would be to "quarantine" the host and refuse to allow it to connect to the network or the hosting fabric, a more practical approach might be to exclude it from hosting but leave it in the network for troubleshooting and mitigation.

Thus, the separation of responsibility between the FM 254 and the secure hosting service may work in the same way as the separation between the VMM 253 and the secure hosting service, with similar benefits: the FM 254 provides automation and orchestration of fabric management, for cost efficiency, speed and reliability, but the security-critical aspects of the fabric are provided by the secure hosting services and not exposed to the FM 254 or the staff entitled to operate.

Changes to the VMM to Fully Support Shielded VMs

The operations of the VMM 253 require no significant change from previously existing VMMs to support operations on shielded VMs, but minor changes can be introduced to aid usage by the tenants and the service provider. For example, the secure hosting process introduces the possibility of new types of failures, such as a host failing attestation and as a consequence a VM deployment or migration to that host failing. As it does with other failure modes, the VMM 253 should understand such failure messages and should take corrective action such as finding another host for the deployment, reporting the failure to the service provider staff for remediation, notifying the tenant of the failure if automatic remediation is not possible or if there is a service degradation or failure to meet service level agreements, including the event in reports, and excluding the failed host from future actions until remediated.

The VMM 253 can also present, in user interfaces and in programming interfaces, options for enabling protection in VM uploading, creation and retrieval workflows. And the VMM 253 can provide facilities to allow the service provider to attach different prices for shielded VMs and integrate similar business matters.

In some embodiments of the present invention, these useful functions are not security-critical, as protection of the VMs relies on the secure hosting infrastructure and not on the untrusted VMM. If the VMM or its database is compromised, operational efficiency and service levels in the datacenter may be impaired but the security of the VMs is not compromised.

Placement of Shielded VMs on Security-capable Hosts

In a typical datacenter there may be several hosts equipped with the hardware and operating system required for secure operation coexisting with several conventional hosts without such capabilities. Such a mixed environment may exist for several years as the datacenter goes through a hardware refreshment cycle. Initially the security-capable hosts may be a scarce resource.

During a similar transition period, some VMs may be shielded while others are not, because their workloads are not deemed sensitive enough to justify the effort or cost of protection, or because the tenant has not yet gone through the process or policy transition to protect all workloads.

With such an environment of heterogeneous hosts and heterogeneous workloads, VMM 253 needs to manage the placement of protected workloads onto security-capable hosts, such as host 230, to avoid doomed placements where the VM 208 would fail to start. In addition, un-protected workloads may be preferentially placed on the conventional hosts, to optimize the service provider's resource utilization and to allow the service provider to charge higher prices for protected execution, if desired. Typical VMMs match a wide range of resource requirements with the characteristics of the hosts and use policy to guide placement for optimal resource utilization or other business goals. Adding the protection capability to that list of characteristics and including it in the placement decision-making is straightforward. The VMM 253 maintains these attributes in its inventory of the hosts in the datacenter. In practice this will involve a discovery mechanism to identify the hosts with this capability. This inventory should be linked with the HAS 258: a host may be known to have the hardware capabilities, but if it at any point fails the attestation process, perhaps because it has been compromised, it is temporarily removed from the list of protection-enabled hosts.

But since the VMM 253 and its operations staff are not trusted, this placement is done in a way that preserves the protection, in spite of the possibility that a service provider staffer with administrator privileges may have the ability to alter the host inventory database in the VMM 253 or compromise the placement decision-making algorithm. The automated inventory management and the S placement algorithm play an important role in reliable and efficient operations in the datacenter, but do not have a role in the workload protection. It should be apparent from the description above that this is addressed: if the VMM 253 is compromised and induced to deploy a shielded VM to an invalid host, that host will not be able to participate in the key distribution process with the KDS and will not be able to unlock and boot the shielded VM, so no tenant data is compromised.

Response to Policy Changes in the Hosts

At various times security policies on the hosts, such as Code Integrity (CI) validation policy (sometimes referred to herein as the Hypervisor-enforced Code Integrity (HVCI) policy), need to change. For example, consider software updates as managed by the FM 254: the service provider may have been notified that a new version of a driver has been released because the previous version was found to contain a security vulnerability. In this case, the new version should be added to the list of allowed software and the previous version should be added to the list of disallowed software. It may be important in these cases that the CI policy is updated at the same time as the update of the driver: if the driver is updated first, before the policy has been updated, the driver will not be allowed to execute and the system may malfunction. If this process is not managed correctly, a widespread software update could disable the entire datacenter. For this reason, the software and policy update are coordinated. In one implementation, the policy update is packaged and distributed as a software update (a "patch"), with a precedence relationship defined so that conventional patching software will deploy the policy update before the software update, and eventually trigger the reboot required to make the policy 264 and driver updates take effect. By relying on existing patching software, the FM can leverage existing automation, such as orchestrating a "rolling update" across a range of hosts to avoid widespread service interruptions, or live migration of VMs to another host prior to updating and rebooting each host.

But there is one more change that is coordinated: the HAS 258 validates that the right CI policy is in effect, so again, if the attestation policy 264 is not updated to recognize and allow the updated CI policy, the server 251 will not pass attestation and will not be allowed to participate in the fabric. The process starts with defining the patch and the updated CI policy based on received information. Then the new CI policy is added to the attestation policy 264. Then the patch is rolled out to servers in some controlled order. And eventually, when all the servers have been updated and the HAS 258 no longer receives attestation requests with the old CI policy, the old CI policy can be removed from the attestation policy 264. This process is under the control of the service provider IT staff, which approves the updates and schedules their application. The technology supports an orderly and secure process, but does not eliminate the requirement for management control of the staff.

In some embodiments of the present invention, the management of these changes with conventional FM tools is separated from the security of the datacenter which is assured by the security infrastructure. Cooperation is valuable for smooth and efficient operations but a compromise of the management systems do not expose VMs to compromise.

Reporting of Security-related Status and Failures

In some embodiments of the present invention, the VMM 253 is entirely out of the security-critical operations: not only does the VMM 253 not participate in the encryption process and the key exchange. It also does not participate in testifying to the successful protection of the shielded VM 208. The protected deployment may fail for any number of security-related reasons: the host 230 may fail attestation because it has been compromised or because policy 264 has changed subsequently to the original deployment, the HAS 258 or KDS 235 may have been compromised or may have failed. The VMM 253 will receive notification of this failure and will report it, just like it handles conventional non-security related failures. But the VMM 253 is not trusted to report security-related failures, since a malicious VMM administrator could fake a success message even when the protection has failed because of a compromise. So while the VMM 253 makes a best-effort report that is useful for everyday operations, the secure hosting service also sends a failure event notification that is sent to a trustworthy event reporting system. This confirmation message is cryptographically robust and is signed by the security infrastructure of the host 230 and the KDS 235.

Separation of Privileges Among Several IT Staffers

While some embodiments of the present invention remove the general management systems (VMM 253 and FM 254) from any role in the security of the datacenter, the HAS 258 and KDS 235 instead, in some embodiments, have important roles. In particular, the HAS 258, in some illustrated examples, is the origin of the trust in the hosts: if the attestation policy is compromised to allow malicious software on the host, the whole security model can fail.

Thus, the HAS 258 and the KDS 235 are protected from compromise. Since one of the threats that can be addressed is that of a malicious administrator with access to the hosts, the VMM 253 or the FM 254, administrator privileges for the HAS 258 and KDS 235 are kept separate from those of the general host or fabric administrators. Specifically, the HAS 258 and KDS 235 are not managed by the VMM 253 or FM 254. It is also recommended that they are not joined to the same domain or forest as the hosts.

This separation of privileges helps to ensure that a successful attack requires collusion between a regular administrator and the special, high-privilege administrator responsible for the attestation policy.

Therefore, the overall system architecture and specifically the HAS 258 and KDS 235 can be constructed such that they do not require any common management between the HAS 258 and KDS 235 on the one hand and the hosts, FM 254 and VMM 253 on the other. They do not need to be in the same domain or forest.

While some embodiments of the invention do not necessarily ensure that these privileges are kept separate, but rather leave that to the process and discipline of the service provider, embodiments may nonetheless be constructed specifically to allow such separation of privileges.

Extensions

Embodiments of the present invention can be extended to provide additional capabilities or meet additional protection or compliance requirements.

Tenant-specific KDS Master Key

In one implementation the KDS 235 protects the vTPM keys encrypting them with a master key belonging to the KDS 235. But the vTPM key may also be encrypted with a separate master key for each tenant, to strengthen protection and isolation, or to meet regulatory compliance requirements. The master key of the KDS 235 may be protected by a TPM, but it may also be desirable to store the tenant-specific keys in a Hardware Security Module (HSM) as this provides secure interchange of keys between the tenant's environment and the service provider's HSM, and for tenant-initiated removal of the master key, among other benefits.

If the fabric uses or supports tenant-specific master keys, some embodiments of the present invention accommodate and support this, providing separation of management automation from security-critical functions. No significant change is required in the interaction among VMM 253, FM 254, HAS 258, KDS 235 or hosts. For operational convenience, the VMM 253 should provide minor operational support functions, such as reflecting tenant identification in reporting and notifications, and should recognize and handle additional failure conditions such as mismatched tenant IDs.

In embodiments, the VM operations described above use one significant change to support the use of an HSM: the VM 208 and its metadata includes the tenant ID, available in unencrypted form to the host 230, so the host can include the tenant ID in the key release request it sends to the KDS

235. In at least some embodiments, this association between the VM 208 and the tenant ID enables management automation and/or enables convenience features such as user interfaces and reports, but is not security-critical and does not have to be tamperproof, because if a false tenant ID is substituted, the wrong encryption key is provided and the vTPM 220 cannot be decrypted.

Tenant-held Keys

Embodiments of the system could be set up so that tenants are responsible for running the KDS 235, perhaps in their own datacenter, and have the service provider's secure hosting services reach out to the tenant whenever they need a key to perform a VM operation. In another implementation, the tenant could contract with a third-party provider to operate the KDS 235 on behalf of the tenant, isolated from the hosting service provider.

Embodiments of the present invention can be readily extended to support such a scenario. The KDS 235 would use a tenant ID that is stored in the clear with the VM 208, and look up the network address in a lookup table. Again, this association between the VM 208 and the tenant ID enables management automation enables convenience features such as user interfaces and reports, but is not necessarily security-critical: if an attacker substitutes an invalid tenant ID, the KDS 235 would reach out to the wrong tenant's KDS and would retrieve invalid keys or nothing at all.

Even when retrieving the vTPM key 255 from the tenant, the need to verify the integrity of the host remains, which can be done by using a HAS 258. While it is possible that the tenant provides a HAS 258 to validate some aspects of the host configuration, other aspects of the host configuration are not be available to the tenant, such as the identifying keys of the known servers. Therefore one implementation uses two steps: first the secure conversation between the host 230, the HAS 258 and the KDS 235 proceeds as described herein to validate the health of the host 230 and release a first key required to unlock the VM 208, and second the KDS 235 or the host 230 reaches out to the tenant's service to retrieve the completion key, perhaps including attestation information. On delivery of both the service provider's and the tenant's key, the VM can be decrypted.

Consideration of the following issues can be taken into account in such an implementation:

- A geographically remote request is more failure-prone than the local operations described above: there may be network outages, the tenant's service may be down, or security keys and certificates needed to establish a secure conversation may have expired. To be practically useful, such a remote key retrieval provides troubleshooting tools.
- The objective of tenant-held keys is that the tenant can validate requests and deny them as appropriate. This may be done manually or with an automated policy. This means that a valid request includes sufficient metadata about the operation, cryptographically signed by the service provider's secure hosting service, to allow such a decision to be made. This metadata can also include the attestation certificate and the information about the host that went into the attestation request.

Complex Policy in the KDS

When making the decision to release the vTPM key 255 the KDS 235 looks only to the attestation certificate 257 of the host: if the host is valid and healthy, it releases the key.

Embodiments of the present invention can be readily extended to implement a more complex policy to determine whether the key should be released that considers other information about the request 256, the VM 208 and the tenant. For example, the system supports transferring a VM to another facility with which the service provider has a trust relationship. But the tenant may want to restrict such moves, for reasons of national data sovereignty or other regulatory compliance, or out of general caution. Such policies could be implemented through an automatic policy system, or could involve human approval workflows.

The KDS 235 can support such policies, requiring only that sufficient metadata about the VM operation is provided with the request 256, as was discussed for the case of tenant-held keys— indeed, the goals and implementation are essentially the same. But since the KDS 235 operates at the service provider's multi-tenant facility, the integrity of the policies is being protected with cryptographic strength. A recommended implementation is to have the tenant, or a privileged administrator of the service provider, sign the policies, and the KDS 235 verifies the signing certificate against the tenant's or service provider's known certificates.

The VMM 253 may include extensions to allow the tenant to enter a policy, and to present failure messages when a VM operation is disallowed by a policy.

Generalization to other Scenarios

The description above focuses on doing secure operations on shielded VMs with the keys protected by an encrypted vTPM. But embodiments of the invention can be applied in other scenarios, with the same benefit of combining management automation using standard tools with security assurance using a security infrastructure.

Other Things that may Need Secure Transfer of Secrets

There are other systems that use encryption or secure communications, and need secure transfer of keys, certificates or other secrets in a way that is not vulnerable to compromise of infrastructure or management systems, or to malicious staff.

For example, within some sphere of interest such as a distributed application service, tenants may want to protect network communication using IPsec or other technologies. These technologies require transfer of keys to the component systems. There are many ways of doing this, but managing the secure transfer of these keys with conventional techniques is difficult or cumbersome, especially in a virtualized environment where the scale and configuration of the application service changes frequently, for example in response to changes in traffic load. And using management tools like the VMM 253 to automate the configuration of the network, and the distribution of the keys, exposes the system to compromise by malicious administrators. Embodiments of the present invention, using a vTPM to protect the VM encryption keys, can be generalized to protect any kind of key or other secret, which permits use of embodiments of the present invention to securely automate distribution of such secrets.

Example elements of an extension to this scenario are (a) a mechanism that requires secure delivery of keys, certificates or other secrets to components in a distributed system, (b) a secure service with functions similar to those of the HAS 258 and KDS 235, (c) a management automation system with functions similar to the VMM 253, and (d) cooperation between them following the pattern illustrated above, where the management system coordinates the processes but is not involved in the security-critical operations.

Other Scenarios that Need Validated or Secret Transfer of Data

Similarly, it is common that systems within a sphere of interest, such as a distributed application, need secure delivery of configuration, policy or business data. "Secure" in this case may mean that the information is secret, protected from leakage, its integrity is validated, or any combination of the above. In any of these cases, cryptographic technology is applicable.

For example, several systems within a service may need to be provisioned with secret credentials to permit access to external services, whether owned by the tenant or by a third party such as a financial institution. In this case, the configuration data is kept private.

In another example, systems in a service need to be configured with limits on scale and traffic volume to protect themselves and other components from overload, to limit costs, prevent system overload or to block denial-of-service attacks. In these cases, the information needs integrity validation to prevent compromise but not confidentiality (although cautious IT staff may prefer to keep the limits secret as well).

In another example, systems in a business service are provisioned with price list and catalog data. These are typically considered secret for business reasons, but their integrity is also protected since compromised price lists could be used for fraudulent transactions. In many systems, such data is kept in a centralized database where secure management is straightforward, but in some distributed architectures such sensitive data may be distributed widely, creating a security management challenge.

Such configuration data may take many forms, such as binary files in some proprietary format, XML files or JSON files. Regardless of the format, their secrecy and integrity can be protected using cryptographic technology, and the keys protected and distributed using the patterns described above.

Again, standard management systems can be used to automate the delivery of such configuration or policy data, but as discussed above, that would expose them to compromise from the fabric or the fabric management staff.

Elements of an extension to this scenario are (a) a mechanism that uses cryptographic technology to validate or keep confidential information during delivery to components in a distributed system, (b) a secure service with functions similar to those of the HAS 258 and KDS 235, (c) a management automation system with functions similar to the VMM 253, and (d) cooperation between them following the patterns illustrated above, where the management system coordinates the processes but is not involved in the security-critical operations.

Protection of other Containers than VMs

VMs are not the only containers for computation. Other containers are increasingly used, often smaller than a VM and contained in a VM. Such small containers are often used for low-cost hosting, for example of web sites. They may offer weaker confidentiality or resource isolation from other containers but this may be an attractive tradeoff for the low cost.

Another example is Remote Desktop Services, also known as Terminal Services, where several user sessions are hosted within one OS environment, each of which has its own data storage within one virtual container equivalent to the My Documents folder on a regular computer.

Another example is a file or storage service that contains information from multiple tenants, arranged and managed in groupings that may be called "storage accounts".

Another example is a database service that contains information from multiple tenants, arranged and managed in containers called databases.

Services such as these are often deployed in distributed, "scale-out" configurations with multiple servers, often VMs, collaborating on handling the load, under the control of a management infrastructure.

The information in such containers may deserve the same kind of protection as the VMs discussed above. Embodiments of the present invention can be applied in the same way as for shielded VMs. The role of the VMM 253 is played by an equivalent management system that deploys and manages the lightweight containers, such as the task manager in an application hosting system, the "broker" for RDS, or the distributed database management system for databases, and as in the case of the VMM 253, in many cases the container manager and its operations staff should not be trusted (note that the container manager, and the container hosting are not constrained to a single host VM, but could be and likely will be distributed across a multitude of VMs). The role of the host 230 in the VM case is played by a machine instance, a physical machine and/or a VM, which can engage in the same kind of secure interchange with the KDS 235 as in the VM case, although the technical details of the attestation may be different since the "host" in this case does not derive its integrity directly from a physical TPM or UEFI but from the integrity of the VM. When applying embodiments of the invention to such lightweight containers, the key management system may not be a vTPM, because in current practice a machine instance can have only one TPM, virtual or not. A similar protection mechanism can be defined to protect the keys for each container, in turn protecting its information through the guest OS vTPM. And the encryption technique may not be a whole volume encryption like Microsoft's BitLocker, but a finer-grained encryption technique applied at a file level to a collection of files, or to another container like the My Documents folder in the RDS case or a database in the database server case. The specifics of the protection mechanism depends on the specific environment. The patterns set forth herein remain valid, with a management system providing automation without participating in the security-critical work, and a secure hosting service providing the assurance, and the "trusted computing base" for the containers leads down through the VSM 266 of the guest, to the VSM of the host 265, to the hardware functions.

Elements of an extension to this scenario are (a) a mechanism for protecting information in such containers that requires secure distribution of keys, certificates or other secrets to components in a distributed system, (b) a secure service with functions similar to those of the HAS 258 and KDS 235, (c) a management automation system with functions similar to the VMM 253, and (d) cooperation between them following the pattern illustrated above, where the management system coordinates the processes but is not involved in the security-critical operations.

VSM

Virtual secure mode (VSM) for virtual machines is discussed herein. A hypervisor implements a virtual secure mode that makes multiple different virtual trust levels available to virtual processors of a virtual machine. Different memory access protections, such as the ability to read, write, and/or execute memory, can be associated with different portions of memory (e.g., memory pages) for each virtual trust level. The virtual trust levels are organized as a hierarchy with a higher level virtual trust level being more privileged than a lower virtual trust level, and programs running in the higher virtual trust level being able to change memory access protections of a lower virtual trust level. The number of virtual trust levels can vary, and can vary for different virtual machines as well as for different virtual processors in the same virtual machine.

Figure 3:
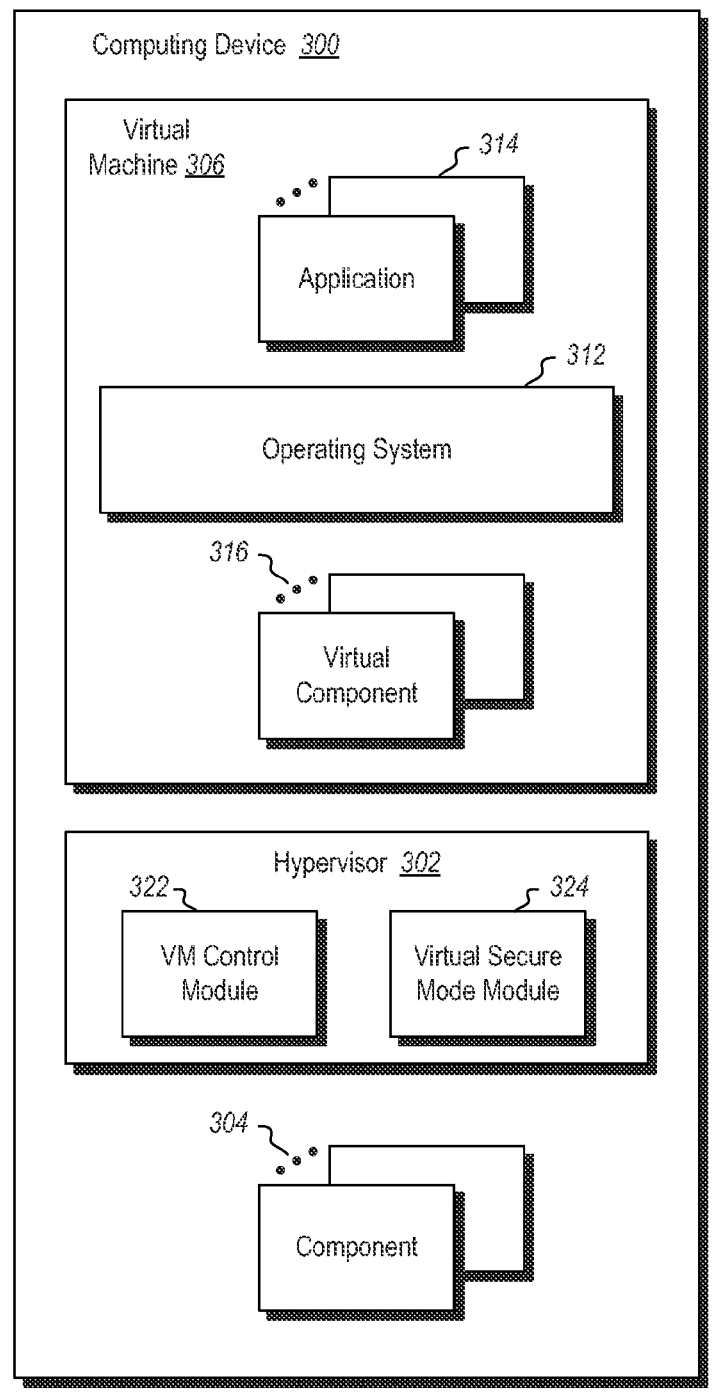
FIG. 3 is a block diagram illustrating an example computing device implementing the techniques discussed herein in accordance with one or more embodiments.

FIG. 3 is a block diagram illustrating an example computing device 300 implementing the techniques discussed herein in accordance with one or more embodiments. The computing device 300 can be any of a variety of different types of devices. For example, the computing device 300 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a wearable computer, and so forth.

The computing device 300 includes a hypervisor 302, also referred to as a hypervisor, and one or more components 304. The hypervisor 302 manages access to the functionality provided by the components 304. Alternatively, the hypervisor 302 can run on a host operating system (not shown), in which case the host operating system manages access to the functionality provided by the components 304.

The components 304 can be a variety of different processor components, input/output (I/O) components, and/or other components or devices. For example, components 304 can include one or more processors or processor cores, one or more memory components (e.g., volatile and/or nonvolatile memory), one or more storage devices (e.g., optical and/or magnetic disks, Flash memory drives), one or more communication components (e.g., wired and/or wireless network adapters), combinations thereof, and so forth. Although illustrated as part of the computing device 300, one or more of the components 304 (e.g., one or more storage devices) can be implemented external to the computing device 300. Various components or modules running on the computing device 300, including the hypervisor 502, can access this functionality provided by the components 304 directly and/or indirectly via other components or modules.

The hypervisor 302 allows a virtual machine 306 to run on the computing device 300. A single virtual machine 306 is illustrated in the computing device 300, although alternatively multiple virtual machines can run on the computing device 300. A virtual machine refers to a software implementation of a physical computing device (or other machine or system) that can run programs analogous to a physical computing device. The virtual machine includes one or more virtual components that are similar to (but are software implementations of) the components 304. An operating system as well as other applications can execute using the virtual components as they would using the components 304, including running on virtual processors or virtual processor cores, accessing virtual memory, and so forth. The operating system and other applications executing in the virtual machine 306 need have no knowledge, and typically have no knowledge, that they are executing in a virtual machine.

Virtual machine 306 includes an operating system 312, one or more applications 314, and one or more virtual components 316. The operating system 312 runs or executes on one or more virtual processors or processor cores included as one or more of the components 316, and manages execution of the applications 314.

The hypervisor 302 includes a virtual machine (VM) control module 322 and a virtual secure mode (VSM) module 324. The virtual machine control module 322 manages the mapping of the virtual components 316 to the components 304, including scheduling of virtual processors or processor cores to execute on physical processors or processor cores. The virtual secure mode module 324 manages a virtual secure mode for the virtual machine 306, providing different virtual trust levels for the virtual components 316 as discussed in more detail below. The virtual trust level is an execution environment for a virtual processor, and each virtual processor can enter or exit a virtual trust level independent of any other virtual processors. Although illustrated as two separate modules, it should be noted that the functionality of the modules 322 and 324 can be combined into a single module (e.g., the functionality of the virtual secure mode module 324 can be included in the VM control module 322).

The virtual secure mode module 324 makes multiple different virtual trust levels (VTLs) available to virtual processors (one or more virtual components 316) of the virtual machine 306 when virtual secure mode is enabled for the virtual machine 306. The virtual secure mode can be enabled or disabled in different manners, such as in response requests from a program (e.g., a virtual secure mode loader) running on a virtual processor, in response to configuration settings of the hypervisor 302, in response to inputs provided by an administrator or user of the computing device 300, and so forth. The computing device 300 can optionally include multiple virtual machines, and virtual secure mode can be enabled or disabled for different virtual machines independently. Thus, at any given time virtual secure mode can be enabled for one or more virtual machines of the computing device 300, and disabled for one or more other virtual machines of the computing device 300.

The hypervisor 302 provides a mechanism by which the operating system 312 can detect the presence of support for the virtual secure mode, as well as other information about the virtual secure mode such as the number of virtual trust levels supported. As an example, the hypervisor 302 could report the presence of support for virtual secure mode and the number of virtual trust levels via a virtual register (e.g., via a CPUID leaf) that could be read by the operating system 312.

The operating system 312 and hypervisor 302 manage storage of and access to memory that is made up of multiple blocks or portions that are referred to as memory pages (or simply pages). The memory can be, for example, any type of CPU (Central Processing Unit) addressable memory, such as volatile memory (e.g., RAM) or nonvolatile memory (e.g., Flash memory). Different programs can be allocated memory pages, and these programs can be applications 314, programs of operating system 312, or other components or modules.

The operating system 312 and hypervisor 302 can allow different types of access to memory pages by a program, such as read access, write access, and execute access. If read access (also referred to as read to as read permission) is given to a memory page, then the content of the memory page is allowed to be read (e.g., by a particular one or more programs). If write access (also referred to as write permission) is given to a memory page, then content is allowed to be written to the memory page (e.g., by a particular one or more programs). If execute access (also referred to as execute permission) is given to a memory page, code stored in (also referred to as stored on) the memory page is allowed to be executed.

The computing device 300 employs virtual memory, which is an address space that is mapped to another address space (e.g., physical memory). An application is assigned a virtual memory space in which the application code is executed and data is stored. A memory manager (e.g., of a processor) manages mapping the virtual memory addresses in the virtual memory space to addresses in the other memory space. When mapping virtual memory addresses from the virtual memory address space to another memory space, an address translation is performed. An address translation table is used to perform this mapping, and can be leveraged to implement the techniques discussed herein.

Figure 4:
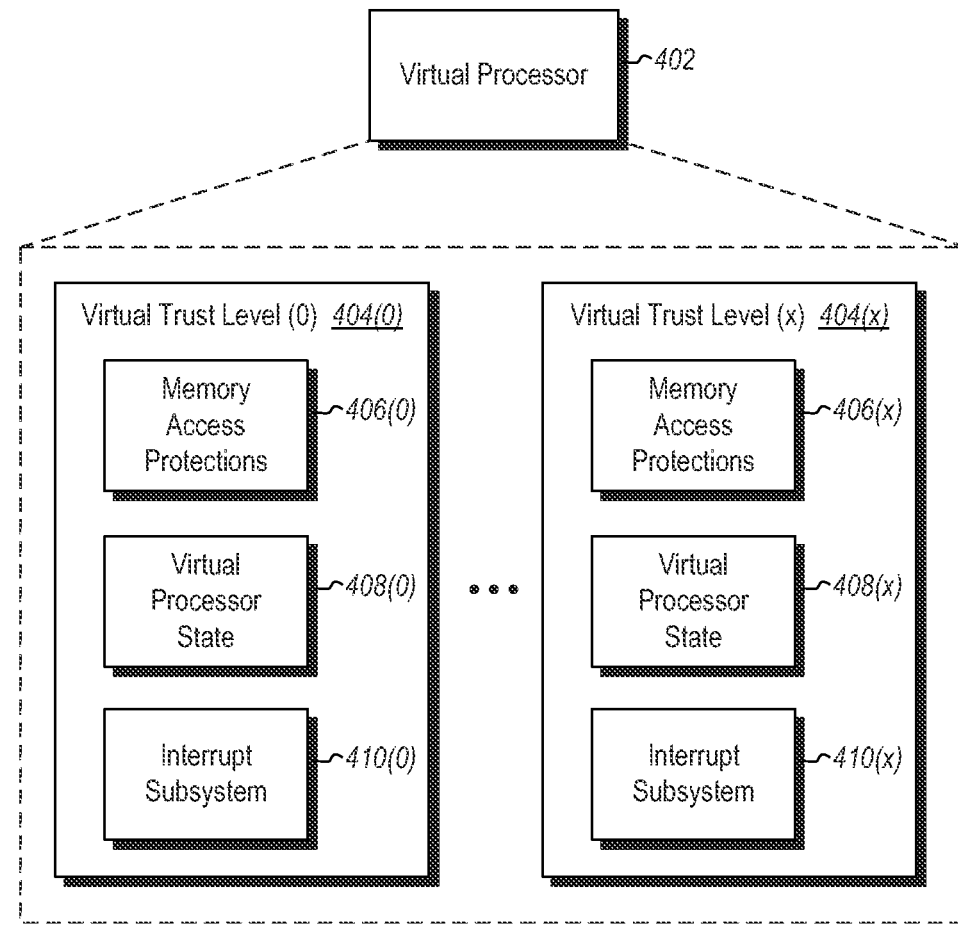
FIG. 4 illustrates an example of multiple virtual trust levels in accordance with one or more embodiments.

FIG. 4 illustrates an example of multiple virtual trust levels in accordance with one or more embodiments. A virtual processor 402, which can be a virtual component 316 of FIG. 3, can run in any number (x) of different virtual trust levels 404(0), . . . , 404(x). The virtual trust levels 404 are included as part of a virtual secure mode provided by the virtual secure mode module 324 of FIG. 3. In one or more embodiments, the virtual processor 402 can run in two different virtual trust levels, referred to as normal mode (e.g., VTL 0) and secure mode (e.g., VTL 1).

Each virtual trust level has associated with it a set of memory access protections 406. Different virtual trust levels can have different sets of access protections, and the set of access protections of a virtual trust level can be used to limit what memory can be accessed and/or how the memory can be accessed when the virtual processor is running in that virtual trust level.

Each virtual trust level also has associated with it a virtual processor state 408. The virtual processor state refers to various different register settings, configuration values, and so forth of the virtual processor 402. Separate virtual processor state 408 is maintained for different virtual trust levels, preventing one virtual trust level from accessing the processor state of another virtual trust level. Although some virtual processor state is maintained separately for different virtual trust levels (also referred to as private processor state), other processor state (also referred to as shared processor state) can be shared across multiple virtual trust levels as discussed in more detail below.

Each virtual trust level also has associated with it an interrupt subsystem 410. The interrupt subsystem refers to various different modules, programs, settings, and so forth for managing interrupts for the virtual processor 402. Separate interrupt subsystems 410 are maintained for different virtual trust levels, allowing interrupts to be managed securely at one virtual trust level while preventing programs running at another (e.g., lower as discussed in more detail below) virtual trust level from generating unexpected interrupts or masking interrupts.

The virtual trust levels are organized as a hierarchy with a higher level virtual trust level being more privileged than a lower virtual trust level, and the lower virtual trust level being less privileged than the higher virtual trust level. A program running on the virtual processor 402 operating in a virtual trust level that is more privileged than another virtual trust level can restrict access to memory locations by programs or devices that are operating in that other virtual trust level. A program running on the virtual processor 402 can also optionally change memory access protections for the virtual trust level at which the virtual processor 402 is running. However, a program running on the virtual processor 402 operating in a virtual trust level that is less privileged than another virtual trust level cannot restrict access to memory locations by programs or devices that are operating in that other virtual trust level. In one or more embodiments, the virtual trust levels are labeled with integer values (e.g., 0, 1, 2, etc.), with virtual trust levels having larger integer values being higher level virtual trust levels than virtual trust levels having smaller integer values. Alternatively, virtual trust levels having smaller integer values can be higher level virtual trust levels than virtual trust levels having larger integer values, or other labeling techniques can be used (e.g., letters, other characters or symbols, and so forth).

In one or more embodiments, memory access protections are implemented on a per-page (per-memory page) basis. Each memory page has associated memory access protections, and the memory access protections for a memory page can be changed independently of the memory access protections of the other memory pages. The memory access protections are also made independent of any requirement that particular pages or ranges of contiguous addresses have the same memory access protections. Although reference is made herein to the memory access protections being implemented on a per-page basis, it should be noted that the memory access protections can alternatively be implemented in other groups or blocks of memory addresses, such as parts of memory pages, multiple memory pages, address ranges, and so forth.

Memory access protections for a virtual trust level can be changed in a variety of different manners. In one or more embodiments, the virtual secure mode module 324 exposes an interface (e.g., a function call) that is called by a program running on the virtual processor 402 to change the memory access protections for a virtual trust level, identifying the memory access protections that are to be changed. In response to the interface being called, the virtual secure module 324 changes the memory access protections as requested (assuming the change is for a lower (or optionally the same) virtual trust level).

The virtual processor 402 can run or operate in only one virtual trust level at any given time, and the virtual trust level that the processor 402 is running or operating in at a particular time is referred to as the active virtual trust level for the processor 402 at that particular time. The virtual processor 402 can switch from one virtual trust level to another in different manners, such as in response to a particular event (e.g., an interrupt, execution of a particular code sequence, and so forth).

Returning to FIG. 3, a physical processor that is a component 304 assigns a virtual machine memory space to a virtual processor that is a virtual component 316, and maintains an address translation table. The address translation table maps addresses in a virtual machine memory space that is assigned to the virtual machine 306 to addresses in a physical memory space (physical memory that is a component 304). Which address of the physical memory space a particular address in the virtual machine memory space maps to at any given time can change, and is controlled by a memory manager (e.g., part of the physical processor). The memory manager can change mappings, allowing multiple different virtual processors to share the physical memory space and/or allowing the virtual machine memory space to be larger than the physical memory space, using any of a variety of public and/or proprietary techniques.

The virtual secure mode module 324 maintains memory access protections for each memory page of the virtual machine memory space, identifying the memory access protections for each virtual trust level of each virtual processor in the virtual machine 306. The virtual secure mode module 324 can maintain the memory access protections for the memory pages in a variety of different manners. In one or more embodiments, the virtual secure mode module 324 maintains a table, list, or other record of the memory access protections for each virtual trust level of each virtual processor in the virtual machine 306. Alternatively, the virtual secure mode module 324 can maintain the memory access protections in other manners, such as part of the address translation table that maps addresses in the virtual machine memory space that is assigned to the virtual machine 306 to addresses in the physical memory space.

In one or more embodiments, a physical processor can support multiple virtual to physical translation layers. Each virtual machine can manage its own virtual to guest physical page mapping. The hypervisor manages the mapping from guest physical to true physical pages. Additionally, each virtual trust level can edit this final mapping to machine physical pages as it applies to any lower level virtual trust level.

Figure 5:
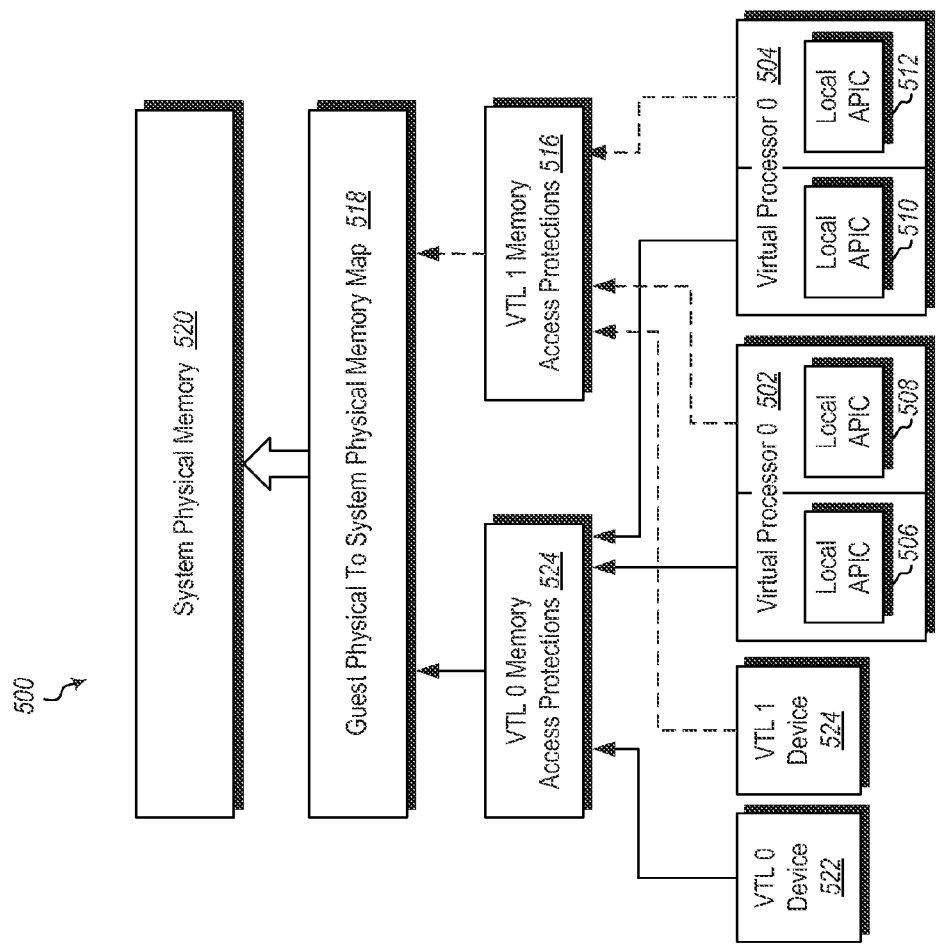
FIG. 5 illustrates an example system implementing multiple virtual trust levels in accordance with one or more embodiments.

FIG. 5 illustrates an example system 500 implementing multiple virtual trust levels in accordance with one or more embodiments. The example system 500 includes two virtual processors: virtual processor 502 and virtual processor 504. The virtual processors 502 and 504 can each be a virtual component 316 of FIG. 3 and/or a virtual processor 402 of FIG. 4.

The virtual processors 502 and 504 implement two different virtual trust levels referred to as VTL 0 and VTL 1. Each virtual trust level of each virtual processor has its own local interrupt subsystem, illustrated as advanced programmable interrupt controller (APIC) 506 (the interrupt controller for VTL 0 of the virtual processor 502), APIC 508 (the interrupt controller for VTL 1 of the virtual processor 502), APIC 510 (the interrupt controller for VTL 0 of the virtual processor 504), and APIC 512 (the interrupt controller for VTL 1 of the virtual processor 504). At any given time, the virtual processors 502 and 504 can be operating in the same or different virtual trust levels. Thus, multiple virtual processors can be running in different virtual trust levels concurrently.

The system 500 maintains a record of memory access protections 514 for VTL 0 as well as a record of memory access protections 516 for VTL 1. The hypervisor (e.g., the virtual secure mode module 324 of FIG. 3) maintains the memory access protections 514 and 516. For each access to an address of a memory page from virtual processor 502 or 504 when running in VTL 0, the hypervisor checks the VTL 0 access memory protections 514 for the memory page that includes the address being accessed. If the VTL 0 access memory protections 514 indicate the access is allowed, then a guest physical to system physical memory map 518 is used to map the address to a memory address of system physical memory 520, and the requested access is performed. The guest physical to system physical memory map 518 is, for example, the address translation table that maps addresses in the virtual machine memory space (guest physical addresses, or GPAs) to addresses in the physical memory space (system physical addresses, or SPAs) as discussed above. However, if the VTL 0 access memory protections 514 indicate that the access is not allowed, then the requested access is denied (is not performed). Because the requested access is denied, no mapping of the address to a memory address of the physical memory 520 need be performed.

Similarly, for each access to an address of a memory page from virtual processor 502 or 504 when running in VTL 1, the hypervisor checks the VTL 1 access memory protections 516 for the memory page that includes the address being accessed. If the VTL 1 access memory protections 516 indicate the access is allowed, then the guest physical to system physical memory map 518 is used to map the address to a memory address of the system physical memory 520, and the requested access is performed. However, if the VTL 1 access memory protections 516 indicate that the access is not allowed, then the requested access is denied (is not performed). Because the requested access is denied, no mapping of the address to a memory address of the physical memory 520 need be performed.

Various different memory access protections can be identified as memory access protections 514 and 516. For example, the memory access protections can include the following protections: No access (addresses on the memory page cannot be read, written, or executed). Read-only, no execute (addresses on the memory page can be read, but cannot be written or executed). Read-only, executable (addresses on the memory page can be read or executed, but cannot be written). Read/write, no execute (addresses on the memory page can be read or written, but cannot be executed). and read/write, executable (addresses on the memory page can be read, written, or executed).

These different memory access protections support various different usage scenarios. For example, when running in VTL 1, the VTL 0 memory access protection for a memory page can be set to "no access". This setting puts the memory page in a "secure" mode, making the memory page inaccessible to programs running on the virtual processors 502 and/or 504 in VTL 0. By way of another example, when running in VTL 1, the VTL 0 memory access protection for a memory page can be set to "read-only, executable". This setting puts the memory page in a mode where it can be read and executed by programs running on the virtual processors 502 and/or 504 in VTL 0, but cannot be altered by programs running on the virtual processors 502 and/or 504 in VTL 0. Thus, various code integrity or other security programs can be stored in the memory pages in VTL 1, and run by programs in VTL 0 while being assured those programs running in VTL 0 cannot alter the programs.

Additional devices can also optionally be associated with a particular virtual trust level. Any additional devices that access memory pages (e.g., performing direct memory access (DMA)) can be associated with a virtual trust level. System 500 includes example devices 522 and 524. Device 522 is associated with VTL 0, and device 522 is allowed to access memory pages in accordance with VTL 0 memory access protections 514, analogous to virtual processors 502 and 504 running in VTL 0. Similarly, device 524 is associated with VTL 1, and device 524 is allowed to access memory pages in accordance with VTL 1 memory access protections 516, analogous to virtual processors 502 and 504 running in VTL 1.

In one or more embodiments, each device 522 and 524 is initialized to operate in the lowest virtual trust level (e.g., VTL 0). A virtual processor 502 or 504 can configure a device to be associated with the active VTL or optionally with any lower level VTL. A virtual processor 502 or 504 can configure a device to be associated with a particular VTL in various manners, such as by invoking a call (e.g., a function) exposed by the hypervisor 302.

The virtual secure mode module 324 of FIG. 3 maintains a record of which devices are associated with which virtual trust levels. The module 324 updates the record to reflect changes in which virtual trust levels are associated with which devices. The virtual secure mode module 324 also maintains a record of which virtual trust level each virtual processor 502 and 504 is operating in at any given time. The virtual processors 502 and 504 can switch from one virtual trust level to another in different manners, and each time such a switch occurs an indication of the virtual trust level switched to is included in the record maintained by the module 324.

In the illustrated example system 500, the memory access protections 514 and 516 for different virtual trust levels are implemented separately, and a common memory map 518 is shared by all of the virtual trust levels. Alternatively, the memory access protections 514 and 516 can be implemented as part of the memory map 518. In such situations, a single memory map 518 can be implemented that includes the memory access protections for all of the virtual trust levels, or alternatively separate memory maps (analogous to memory map 518), each memory map including the memory access protections for a different virtual trust level.

Returning to FIG. 3, in one or more embodiments the virtual processors of virtual machine 306 are initialized to run in a single virtual trust level, such as VTL 0. With only a single virtual trust level, the virtual machine 306 can also be referred to as virtual secure mode not being enabled for the virtual machine 306. In order to run in a higher virtual trust level, the virtual machine 306 is enabled for one or more higher virtual trust levels (also referred to as enabling the virtual secure mode for the virtual machine 306). After a higher virtual trust level is enabled, a program running in the higher virtual trust level can change the memory access protections for a lower virtual trust level.

In one or more embodiments, one or more higher virtual trust levels can be enabled for the virtual machine 306 at a variety of different times. For example, one or more higher virtual trust levels can be enabled for the virtual machine 306 during creation of the virtual machine 306 and/or booting of the hypervisor 302, after the virtual machine 306 has booted and has been running for a threshold amount of time (e.g., a number of minutes or hours), and so forth.

Figure 6:
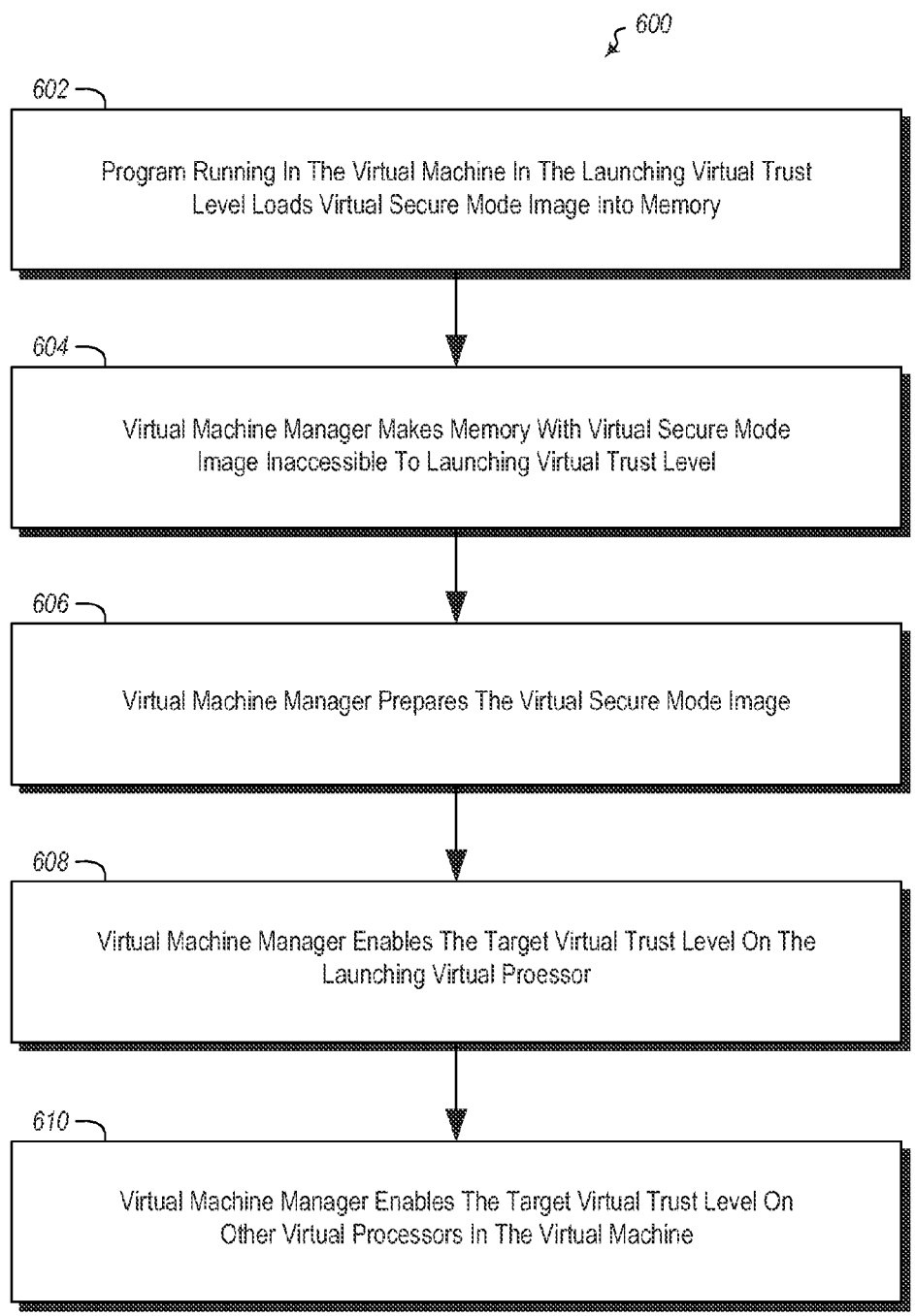
FIG. 6 is a flowchart illustrating an example process for enabling the virtual secure mode for a virtual machine in accordance with one or more embodiments.

FIG. 6 is a flowchart illustrating an example process 600 for enabling the virtual secure mode for a virtual machine in accordance with one or more embodiments. Process 600 is carried out by a program running in the virtual machine and a hypervisor, such as a program running in virtual machine 306 of FIG. 3 and hypervisor 302 of FIG. 3, and can be implemented in software, firmware, hardware, or combinations thereof. Process 600 is shown as a set of acts and is not limited to the order shown for performing the operations of the various acts. Process 600 is an example process for enabling the virtual secure mode for a virtual machine; additional discussions of enabling the virtual secure mode for a virtual machine are included herein with reference to different figures.

In process 600, a program running in the virtual machine loads a virtual secure mode image into memory (act 602). The program can be viewed as running in the lowest virtual trust level (even though the virtual secure mode is not yet enabled). The virtual trust level that the program is running in is also referred to as the launching virtual trust level. In one or more embodiments, the virtual secure mode image is loaded into memory by the program (which may be referred to as a virtual secure mode loader) copying into or otherwise placing the virtual secure mode image in memory pages of the virtual memory space of the virtual machine. The virtual secure mode image refers to code and data (e.g., object code that can be executed by a processor) that, when executed, implements the virtual secure mode.

The hypervisor is also notified (e.g. by the program that loads the virtual secure mode image) of the memory pages into which the virtual secure mode image is loaded. The hypervisor can be notified in different manners, such as by the virtual secure mode loader invoking a call exposed by the hypervisor (also referred to as a hypercall) and providing as a parameter of the hypercall an indication of the memory pages into which the virtual secure mode image is loaded. The hypercall can be, for example, an HvLoadVsmImage() hypercall.

In response to the notification of the memory pages into which the virtual secure mode image is loaded, the hypervisor makes those memory pages inaccessible to the launching virtual trust level (act 604). The hypervisor also makes those memory pages inaccessible to virtual trust levels (if any) that are a lower level than the launching virtual trust level. The memory pages can be made inaccessible in different manners, such as making the memory access protections for the memory pages "no access" for the launching virtual trust level (and any virtual trust levels that are a lower level than the launching virtual trust level).

Additionally, the hypervisor prepares the virtual secure mode image (act 606). Preparation of the virtual secure mode image refers to putting the hypervisor in a state to be able to execute and verify the virtual secure mode image. This preparation can include recording various internal state regarding the location (e.g., the memory pages) where the virtual secure mode image is stored, and also generating a hash value of the virtual secure mode image. Upon the first entry into a higher level virtual trust level after the higher level virtual trust level has been enabled on a virtual processor, the virtual processor is expected to be executing in a well-defined state. This allows assurance that the initial program or programs running in the higher level virtual trust level operate correctly. The initial program or programs that run in a higher level virtual trust level can use this information as they boot-strap their execution environment in the higher level virtual trust level.

The hash value of the virtual secure mode image can be generated using any of a variety of public and/or proprietary hashing functions, such as any of the Secure Hash Algorithm (SHA) family of hashing functions. The hash value can be a hash value of the virtual secure mode image across all memory pages, or alternatively a collection of the hash values of each of the memory pages into which at least part of the virtual secure mode image is loaded. The hash value can be used, for example, by the hypervisor to subsequently verify that the virtual secure mode image is not altered after being loaded into memory. Another use of the hash value is to send it to the TPM to be added to the PCR register state so that the TPM can attest to the software configuration of the VTL.

The hypervisor then enables the target virtual trust level on the launching virtual processor (act 608). The target virtual trust level refers to a virtual trust level higher than the launching virtual trust level. The launching virtual processor refers to the virtual processor running the virtual secure mode loader. In one or more embodiments, the hypervisor enables the target virtual trust level on the launching virtual processor in response to a hypercall exposed by the hypervisor being invoked by the virtual secure mode loader. The hypercall can be, for example, an HvEnableVtl() hypercall.

The hypervisor then enables the target virtual trust level on other virtual processors in the virtual machine (act 610). In one or more embodiments, the hypervisor enables the target virtual trust level on the other virtual processors in response to a hypercall exposed by the hypervisor being invoked by the virtual secure mode loader. The virtual secure mode loader can provide as a parameter of the hypercall, an identifier of a virtual processor on which the target virtual trust level is to be enabled, or alternatively the hypercall can indicate to enable the target virtual trust level on all other virtual processors in the virtual machine. The virtual secure mode loader can also optionally provide an initial virtual processor context to use for the target virtual trust level of the other virtual processors on which the target virtual trust level is being enabled. The hypercall can be, for example, an HvEnableVtl() hypercall.

In embodiments in which three or more virtual trust levels are implemented, acts 608 and 610 can be repeated for each additional higher level virtual trust level to be enabled. For each higher level virtual trust level, the hypercalls exposed by the hypervisor are invoked by the virtual secure mode loader (or other program running in a virtual trust level lower than the target virtual trust level being enabled).

In one or more embodiments, each virtual trust level for a virtual machine can be enabled and disabled separately. A virtual trust level can be disabled on a processor by invoking a call of the hypervisor (e.g., a HvDisableVtlVp hypercall) that identifies a virtual processor on which the virtual trust level is to be disabled. The call is invoked by a virtual processor operating in the virtual trust level that is being disabled. In response to the call, the hypervisor disables that virtual trust level on the identified virtual processor. The hypervisor optionally triggers an exit to a lower virtual trust level on the identified virtual processor, so that the identified virtual processor is running in that lower virtual trust level.

Additionally, in one or more embodiments, all higher virtual trust levels for a virtual machine can be disabled, effectively removing the virtual secure mode for a virtual machine. The virtual secure mode can be removed from a virtual machine by disabling all but the lowest level virtual trust level on all but one virtual processor (referred to as the final virtual processor) of the virtual machine. Higher level virtual trust levels can be disabled on a processor by invoking a call of the hypervisor (e.g., a HvDisableVtlVp hypercall) that identifies a virtual processor on which the higher virtual trust levels are to be disabled. The call is invoked by a virtual processor operating in the higher virtual trust level that is being disabled. In response to the call, the hypervisor disables all but the lowest virtual trust level on the identified virtual processor.

All but the lowest level virtual trust level is then disabled on the final virtual processor of the virtual machine. The higher virtual trust levels are disabled by invoking a call of the hypervisor (e.g., a HvDisableVTL hypercall). The call is invoked by the final virtual processor operating in the higher virtual trust level that is being disabled. In response to the call, the hypervisor triggers an exit to the a lowest level virtual trust level on the final virtual processor. At this point, all of the virtual processors in the virtual machine are running in the lowest level virtual trust level. The virtual secure mode image is then unloaded by invoking a call of the hypervisor (e.g., a HvUnloadVsm hypercall). In response to this call, all memory access protections are reverted to their original state, resulting in the memory pages being accessible to the lowest level virtual trust level, including memory pages storing the virtual secure mode image accessible (e.g., the memory that was made inaccessible in act 604)

In an alternative embodiment, the hypervisor starts the virtual CPU in the highest privilege VTL, and the code there starts the lower VTL levels. This proceeds along similar lines, but can be simpler because, in some embodiments, the higher VTL level can be trusted not to corrupt the lower VTL levels Returning to FIG. 4, the virtual processor 402 can change the active virtual trust level in a variety of different manners. Switching or changing from a lower virtual trust level to a higher virtual trust level is also referred to as entering the higher virtual trust level, and switching or changing from a higher virtual trust level to a lower virtual trust level is also referred to as exiting the higher virtual trust level.

In one or more embodiments, the virtual processor 402 can switch or change from a lower virtual trust level to a higher virtual trust level in response to one or more events occurring, such as a virtual trust level call, an interrupt for a higher virtual trust level, a trap (e.g., to allow a higher virtual trust level to process certain types of faults, such as page faults, for lower virtual trust levels), or an intercept into a higher virtual trust level. A virtual trust level call refers to a particular one or more instructions (e.g., a particular sequence of instructions) being executed to transition from the current virtual trust level to a higher virtual trust level. An interrupt for a higher virtual trust level refers to receipt of an interrupt for (an interrupt targeting) a higher virtual trust level than the current virtual trust level. An intercept into a higher virtual trust level refers to an operation accessing a protected address or protected component of a higher virtual trust level, such as a register of a higher virtual trust level, an I/O port associated with a higher virtual trust level, or a memory page associated with a higher virtual trust level.

Some processor state of the virtual processor 402 is shared across different virtual trust levels, and is also referred to as shared processor state. The shared processor state need not change when changing the active virtual trust level, improving the efficiency of changing virtual trust levels. However, other processor state of the virtual processor 402 is not shared across different virtual trust levels, and is also referred to as private processor state. The private processor state, illustrated as virtual processor state 408, is changed when changing the active virtual trust level.

It should be noted that although when changing the active virtual trust level the shared processor state remains unchanged, programs running in a virtual trust level may have different policies regarding how they handle shared processor state depending on the reason why the virtual trust level became active. For example, if a virtual trust level becomes active due to a virtual trust level call, a program running in the newly active virtual trust level may not need to save the shared processor state, as programs in the previous virtual trust level (the virtual trust level that invoked the call to the newly active virtual trust level) can tolerate the shared processor state changing. However, if a virtual trust level becomes active due to an interrupt, programs running in the previous virtual trust level (the virtual trust level that was interrupted) likely cannot tolerate the shared processor state changing, as they are unaware that a virtual trust level change occurred. In this case, a program running in the newly active virtual trust level can save the shared processor state before changing the shared processor state, so that the program running in the newly active virtual trust level can restore the shared processor state upon completion of the interrupt processing (so that the previous virtual trust level can be resumed in its original state, making the interrupt transparent to programs running in the previous virtual trust level).

In one or more embodiments, the private processor state includes an instruction pointer (or program counter) register and a stack pointer register. The private processor state for the active virtual trust level is saved by the hypervisor when changing the active virtual trust level, and is replaced with the private processor state for the virtual trust level being changed to. The private processor state for the virtual trust level being changed to can be a default/initialization state (if the virtual trust level has not been previously entered), or the previously saved private processor state for the virtual trust level (saved prior to the virtual processor 402 last changing away from the virtual trust level).

In one or more embodiments, the hypervisor maintains for each virtual trust level 404 (other than a lowest level virtual trust level) a control page used for bi-directional communication between the hypervisor and programs running in the virtual trust level. The control page may include an indication of a reason why the virtual trust level was entered (e.g., the event that occurred that caused the higher virtual trust level to be entered), an indication of the previous virtual trust level (the active virtual trust level at the time that the event occurred to cause the higher virtual trust level to be entered), and optionally an indication of additional information describing or related to the event that occurred that caused the higher virtual trust level to be entered.

In one or more embodiments, the virtual processor 402 can switch from one virtual trust level to only the next higher virtual trust level. For example, the virtual processor 402 can switch from VTL 0 to VTL 1, from VTL 1 to VTL 2, from VTL 2 to VTL 3, and so forth, but not from VTL 0 to VTL 3. Alternatively, the virtual processor can switch from one virtual trust level to any higher virtual trust level. For example, in a virtual trust level call the virtual processor 402 can specify which higher virtual trust level is being switched to, allowing switching from VTL 0 to VTL 3.

After being switched from a lower virtual trust level to a higher virtual trust level, the virtual processor 402 can switch or change back to the lower virtual trust level (exit the higher virtual trust level) in response to a variety of different events. In one or more embodiments, the virtual processor 402 performs one or more actions (e.g., performing one or more operations, handling an interrupt, etc.) and then returns to the lower virtual trust level. The virtual processor 402 returns to the lower virtual trust level by executing a particular one or more instructions (e.g., a particular sequence of instructions) to transition from the current virtual trust level to a lower virtual trust level. These instructions are optionally stored on a memory page referred to as the virtual trust level exit code page, which allows the hypervisor to abstract the code sequence to switch virtual trust levels. In one or more embodiments, the virtual processor 402 returns to the lower virtual trust level from which the active virtual trust level was entered, although alternatively the virtual processor 402 can return to a different virtual trust level.

For shared processor state the processor state does not change when changing virtual trust levels, which allows for passing of information between virtual trust levels using the shared processor state. For private processor state, each virtual trust level has its own instance of the processor state (e.g., registers) that can be accessed only by that virtual trust level. The hypervisor manages saving and restoring such processor state (e.g., contents of registers) when switching between virtual trust levels. When entering a virtual trust level 404, the private processor state is the same (e.g., the registers contain the same values) as when the virtual processor 402 last ran in that virtual trust level 402.

In general, registers that are to be configured appropriately upon entry into a virtual trust level in order for code to execute in the virtual trust level are private processor state. A higher level virtual trust level is assured that it can reliably get execution control of a virtual processor in a well-defined state that cannot be altered by a lower level virtual trust level. Thus, key control registers and registers that are critical for controlling execution flow are private processor state for each virtual trust level. General purpose register state that does not directly alter code flow upon entry into a virtual trust level can be shared processor state or private processor state.

In one or more embodiments, general purpose registers, vector registers, and floating point registers are shared processor state, except for an instruction pointer (or program counter) register and a stack pointer register. The instruction pointer (or program counter) register and stack pointer register are private processor state. Control registers are also private processor state, except for a page fault register. The page fault register (e.g., the CR2 register for X64 architecture processors) is shared processor state.

Table I illustrates examples of registers that are shared processor state (listed as type "shared" in Table I), and examples of registers that are private processor state (listed as type "private" in Table I). The registers illustrated in Table I are examples for X64 architecture processors. It is to be appreciated that these registers are examples, that not all processor architectures include all of these registers, and that different processor architectures can include different (but optionally analogous) registers.

TABLE I

| Type | Registers |
| --- | --- |
| Shared | Rax, Rbx, Rcx, Rdx, Rsi, Rdi, Rbp |
|  | CR2 |
|  | R8-R15 |
|  | DR0-DR6 |
|  | XCR0 (XFEM) |
|  | X87 floating point state |
|  | XMM state |
|  | AVX state |
| Private | RIP, RSP |
|  | RFLAGS |
|  | CR0, CR3, CR4 |
|  | DR7 |
|  | IDTR, GDTR |
|  | CS, DS, ES, FS, GS, SS, TR, LDTR |
|  | TSC |

In one or more embodiments, the hypervisor also maintains various different machine state registers (MSRs), which are also referred to as virtual registers, some of which are shared processor state and some of which are private processor state. Table II illustrates examples of MSRs that are shared processor state (listed as type "shared" in Table II), and examples of MSRs that are private processor state (listed as type "private" in Table II). The registers in Table II that have the prefix "HV_X64" refer to registers in the Hyper-V® virtualization software available from Microsoft Corporation of Redmond, Wash., whereas the registers in Table II that do not have the prefix "HV_X64" refer to standard X64 architecture registers. The MSRs illustrated in Table II are examples for virtual machines running on X64 architecture processors. It is to be appreciated that these MSRs are examples, that not all virtual secure mode need include all of these MSRs, and that different processor architectures can include different (but optionally analogous) registers. Additionally, the classification of each MSR is also only for examples, and might be different in different embodiments.

TABLE II

| Type | Registers |
| --- | --- |
| Shared | HV_X64_MSR_TSC_FREQUENCY |
|  | HV_X64_MSR_VP_INDEX |

TABLE II-continued

| Type | Registers |
|---|---|
| | HV_X64_MSR_VP_RUNTIME |
| | HV_X64_MSR_RESET |
| | HV_X64_MSR_TIME_REF_COUNT |
| | HV_X64_MSR_GUEST_IDLE |
| | HV_X64_MSR_DEBUG_DEVICE_OPTIONS |
| | HV_X64_MSR_BELOW_1MB_PAGE |
| | HV_X64_MSR_STATS_PARTITION_RETAIL_PAGE |
| | HV_X64_MSR_STATS_VP_RETAIL_PAGE |
| | MTRR's |
| | MCG_CAP |
| | MCG_STATUS |
| Private | SYSENTER_CS, SYSENTER_ESP, SYSENTER_EIP, STAR, LSTAR, CSTAR, SFMASK, EFER, KERNEL_GSBASE, PAT, FS.BASE, GS.BASE |
| | HV_X64_MSR_HYPERCALL |
| | HV_X64_MSR_GUEST_OS_ID |
| | HV_X64_MSR_REFERENCE_TSC |
| | HV_X64_MSR_APIC_FREQUENCY |
| | HV_X64_MSR_EOI |
| | HV_X64_MSR_ICR |
| | HV_X64_MSR_TPR |
| | HV_X64_MSR_APIC_ASSIST_PAGE |
| | HV_X64_MSR_NPIEP_CONFIG |
| | HV_X64_MSR_SIRBP |
| | HV_X64_MSR_SCONTROL |
| | HV_X64_MSR_SVERSION |
| | HV_X64_MSR_SIEFP |
| | HV_X64_MSR_SIMP |
| | HV_X64_MSR_EOM |
| | HV_X64_MSR_SINT0-HV_X64_MSR_SINT15 |

Additionally, as discussed above, the virtual trust levels 404 have separate interrupt subsystems, with each virtual trust level 404 having its own interrupt subsystem 410. The separate interrupt subsystems 410 allow programs running in a virtual trust level to send inter-processor interrupts securely between virtual processors without interference from lower virtual trust levels. The separate interrupt subsystems 610 also allow the interrupt subsystem of a virtual trust level to securely receive interrupts from devices associated with that same virtual trust level without interference from programs in lower virtual trust levels. The separate interrupt subsystems 410 also allow each interrupt subsystem 410 to have a secure timer facility that cannot be interfered with by programs in lower virtual trust levels. The separate interrupt subsystems 410 also allow an interrupt subsystem 410 to receive notification upon receipt of interrupts for (interrupts targeting) a lower virtual trust level in order to allow for co-operative scheduling of interrupts between virtual trust levels.

For the active virtual trust level, interrupts can be received by the hypervisor for the active virtual trust level, for a higher virtual trust level than the active virtual trust level (unless the active virtual trust level is the highest virtual trust level for the virtual machine), or for a lower virtual trust level than the active virtual trust level (unless the active virtual trust level is the lowest virtual trust level for the virtual machine). In one or more embodiments, the interrupt includes an indication of the virtual trust level that the interrupt is for (that the interrupt targets). In response to receipt of an interrupt targeting the active virtual trust level, the interrupt subsystem 410 of the active virtual trust level handles the interrupt.

In response to receipt of an interrupt targeting a higher virtual trust level than the active virtual trust level, the hypervisor can take a variety of different actions. In one or more embodiments, an intercept control MSR (e.g., the HV_X64_MSR_VSM_INTERCEPT_CTL MSR) includes an interrupt VTL exiting setting that determines the action to take. If the interrupt VTL exiting setting has one value (e.g., indicating to always exit), then the hypervisor switches the active virtual trust level to the higher virtual trust level, and the interrupt subsystem 410 of the higher virtual trust level handles the interrupt. However, if the interrupt VTL exiting setting has another value (e.g., indicating to check interruptibility), then the hypervisor switches the active virtual trust level to the higher virtual trust level only if a processor state of the higher virtual trust level indicates that the higher virtual trust level can be interrupted. Alternatively, the interrupt VTL exiting setting can be maintained in other locations, such as a control page of the active virtual trust level (or of the higher virtual trust level).

Alternatively, the action to take can be determined in different manners. For example, the hypervisor can provide a mechanism to allow a higher virtual trust level to designate specific interrupt vectors that will trigger a switching of the active virtual trust level to the higher virtual trust level for handling of the interrupt by the interrupt subsystem 410 of the higher virtual trust level. Alternatively, various different state criteria can be applied by the hypervisor, and the hypervisor can switch the active virtual trust level to the higher virtual trust level for handling of the interrupt by the interrupt subsystem 410 of the higher virtual trust level only if the state criteria are satisfied by the active virtual trust level.

In response to receipt of an interrupt targeting a lower virtual trust level than the active virtual trust level, the hypervisor maintains a record of the interrupt for subsequent delivery to the interrupt subsystem 410 of the lower virtual trust level. In one or more embodiments, the interrupt does not pre-empt operation of the virtual processor 402 in the active virtual trust level. Rather, the hypervisor provides the interrupt to the interrupt subsystem 410 of the lower virtual trust level when the virtual processor 402 next switches to operating in that lower virtual trust level.

It should be noted that situations can arise in which it is desirable for a higher virtual trust level to be notified when a lower virtual trust level is sent an interrupt. This could be desirable, for example, in situations where a program of the higher virtual trust level desires to allow the virtual processor to return to the lower virtual trust level to handle an interrupt. In one or more embodiments, an interrupt notification facility is provided to facilitate notifying a higher virtual trust level when a lower virtual trust level is sent an interrupt. This interrupt notification facility can be provided in different manners, such as a control MSR (e.g., an HV_X64_MSR_VTL_CTL MSR). This interrupt notification facility can prevent a higher virtual trust level from delaying the interrupt processing for a lower virtual trust level for a long period of time.

When using the interrupt notification facility, in response to receipt of an interrupt targeting a lower virtual trust level than the active virtual trust level, the hypervisor evaluates the private processor state and state of the interrupt subsystem 410 of the lower virtual trust level to determine if the interrupt can be presented to the interrupt subsystem 410 of the lower virtual trust level. If, due to various private processor state or interrupt subsystem 410 state, the interrupt cannot be presented to the lower virtual trust level interrupt subsystem 410, then the interrupt is marked as pending and no further action on the interrupt is taken. However, if the interrupt can be presented to the lower virtual trust level interrupt subsystem 410, then the hypervisor maintains a record of the interrupt for subsequent delivery to the interrupt subsystem 410 of the lower virtual trust level as discussed above, and generates an interrupt at the active virtual trust level. The interrupt generated at the active virtual trust level (e.g., an interrupt to an interrupt vector specified in the HV_X64_MSR_VTL_CTL MSR) results in a program running at the active virtual trust level deciding how to the respond to the interrupt. The program can have the hypervisor exit the higher virtual trust level, allowing the lower virtual trust level to handle the interrupt targeting the lower virtual trust level. However, the hypervisor need not exit the higher virtual trust level, or the program can delay having the hypervisor exit the higher virtual trust level for various amounts of time.

Additionally, as discussed above, the hypervisor can switch to a higher virtual trust level in response to an intercept into the higher virtual trust level. In one or more embodiments, the hypervisor allows a higher virtual trust level to specify particular resources or components that are locked and inaccessible to programs in lower virtual trust levels. The hypervisor can allow the higher virtual trust level to lock and make inaccessible, for example, particular input/output (I/O) port access controls, MSR access controls, memory access controls, and/or control registers. The higher virtual trust level can specify (e.g., via various MSR settings or in other manners), which particular I/O port access controls, MSR access controls, memory access controls, and/or control registers are locked. In response to an attempt being made (e.g., by a program or device) to access a resource or component locked by a higher virtual trust level, an intercept into the higher virtual trust level is generated. In response to the intercept, the hypervisor switches the virtual processor to the higher virtual trust level (or alternatively to a highest virtual trust level supported by the virtual processor).

The higher virtual trust level is able to respond to the intercept in a variety of different manners. For example, a program in the higher virtual trust level can consider the access fatal and trigger some indication of failure. By way of another example, a program in the higher virtual trust level can emulate access to the resource or component. In order to enable such emulation, the hypervisor provides hypercalls that can be used to manipulate the context of the lower virtual trust level that resulted in the intercept. By way of another example, a program in the higher virtual trust level can proxy execution of access to the resource or component. By way of yet another example, a program in the higher virtual trust level can reflect a secure intercept to a lower virtual trust level.

In one or more embodiments, in situations in which the virtual processor 402 includes three or more virtual trust levels, rather than supporting nesting of secure intercept facilities the hypervisor provides a single set of access control MSRs that are shared across all the virtual trust levels. Programs in the virtual trust levels that desire to use the access control MSRs can cooperate using their own defined interfaces, or alternatively a program in the highest virtual trust level can emulate support of the intercept facilities to lower virtual trust levels (e.g., the higher virtual trust level injecting a secure intercept into a lower virtual trust level). Alternatively, nesting of secure intercept facilities can be supported by the hypervisor, and separate access control MSRs can be used for different virtual trust levels.

Various different MSRs are supported by the hypervisor. The following are examples of several MSRs that can be supported by the hypervisor. Specific fields for the MSRs are listed. It is to be appreciated, however, that these MSRs are examples, and that other registers, bit layouts for registers, fields, and so forth can alternatively be used.

Table III illustrates an example of an HV_X64_MSR_VTL_CTL MSR, which is available for each higher virtual trust level (all but the lowest level virtual trust level) on each virtual processor. Each higher virtual trust level has its own instance of the HV_X64_MSR_VTL_CTL MSR, except for VTL 0. The HV_X64_MSR_VTL_CTL MSR controls various attributes of how the VSM operates for the higher virtual trust level.

TABLE III

| Field | Description |
| --- | --- |
| Control Page | Identifies the guest physical memory page number of the virtual secure mode control page. |
| Interrupt Notification Assist Vector | Identifies the interrupt vector to invoke in the active VTL when a lower VTL receives a presentable interrupt. A presentable interrupt refers to an interrupt that can actually be presented to the lower VTL (and is not currently blocked by that environment). |

Table IV illustrates an example of an HV_X64_MSR_VTL_CALL MSR, which is used to identify a GPA page on which to map the VTL call code page. The HV_X64_MSR_VTL_CALL MSR is shared across the virtual machine. There is one instance of the HV_X64_MSR_VTL_CALL MSR in a virtual machine for each virtual trust level (except for the highest virtual trust level). When the HV_X64_MSR_VTL_CALL MSR is enabled, the address specified in the Code Page GPA field is overlaid with the virtual trust level call code page (the control page used for bi-directional communication between the hypervisor and programs running in the virtual trust level as discussed above).

TABLE IV

| Field | Description |
| --- | --- |
| Code Page GPA | Guest physical page number of where to map the VTL call code page. |
| Non-Privileged Access | If set to one value (e.g., 1), allows non-privileged (all but the lowest virtual trust level) programs to initiate a VTL call. If set to another value (e.g., 0), attempts to initiate a VTL call by non-privileged programs result in an exception. |
| Mapped | Indicates if the VSM call code page is mapped (enabled). |

Table V illustrates an example of an HV_X64_MSR_VTL_STATUS MSR, which provides information about the virtual trust level status of a virtual processor. The HV_X64_MSR_VTL_STATUS MSR is for an individual virtual processor, and there is one instance of the HV_X64_MSR_VTL_STATUS MSR per virtual trust level of the virtual processor.

TABLE V

| Field | Description |
| --- | --- |
| VTL + 1 Partition Status | Indicates the current virtual machine status of the next higher virtual trust level. |
| VTL + 1 Enabled | Indicates if the next higher virtual trust level is enabled for the virtual processor. |
| Current VTL | Indicates the current virtual trust level of the virtual processor. |

Table VI illustrates an example of an HV_X64_MSR_VTL_EXIT MSR, which is used to identify a GPA page on which to map the virtual trust level exit code page. The HV_X64_MSR_VTL_EXIT MSR is shared across the virtual machine. There is one instance of the HV_X64_MSR_VTL_EXIT MSR in a virtual machine for each virtual trust level (except for the lowest virtual trust level). When the HV_X64_MSR_VTL_EXIT MSR is enabled, the address specified in the VTL Exit Code Page GPA field is overlaid with the virtual trust level exit code page.

TABLE VI

| Field | Description |
| --- | --- |
| VTL Exit Code Page GPA | Guest physical page number of where to map the VTL exit code page. |
| Mapped | Indicates if the VSM exit code page is mapped (enabled). |

Table VII illustrates an example of an HV_X64_MSR_VSM_INTERCEPT_CTL MSR, which controls what types of intercepts will trigger an entry into a higher virtual trust level. The HV_X64_MSR_VSM_INTERCEPT_CTL MSR is for an individual virtual processor, and is shared by the virtual trust levels of the virtual processor (although the HV_X64_MSR_VSM_INTERCEPT_CTL MSR is not available in the lowest virtual trust level).

TABLE VII

| Field | Description |
| --- | --- |
| Secure Interrupt | Determines the behavior when an interrupt is received that is targeted at a higher virtual trust level. |
| VTL Exiting | One value (e.g., 0) indicates to always exit, another value (e.g., 1) indicates to conditionally exit (indicating to check interruptibility). |
| GPA Exception | Determines if GPA access violations in a lower virtual trust level are to be intercepted and cause an entry into a higher virtual trust level. |
| MSR Access | Determines if accesses to MSRs in a lower virtual trust level are to be intercepted and cause an entry into a higher virtual trust level. If this is enabled (e.g., set to 1), the specific MSRs that trigger intercepts are determined by the setting of the HV_X64_MSR_VSM_MSR_CTL MSR. |
| I/O Port | Determines if accesses to I/O ports in a lower virtual trust level are to be intercepted and cause an entry into a higher virtual trust level. If this is enabled (e.g., set to 1), the specific I/O ports that trigger intercepts are determined by the setting of the HV_X64_MSR_VSM_IOPORT_CTL0 MSR and of the HV_X64_MSR_VSM_IOPORT_CTL1 MSR. |

Table VIII illustrates an example of an _X64_MSR_VSM_IOPORT_CTL MSR, which controls control which I/O port accesses trigger an intercept into the highest (or a higher) virtual trust level. Two HV_X64_MSR_VSM_IOPORT_CTL MSRs can be included, having the same fields and referred to as the HV_X64_MSR_VSM_IOPORT_CTL0 MSR and the HV_X64_MSR_VSM_IOPORT_CTL1 MSR. These two MSRs are for an individual virtual processor, and each is shared by the virtual trust levels of the virtual processor (although these two MSRs are not available in the lowest virtual trust level).

TABLE VIII

| Field | Description |
| --- | --- |
| I/O Port Control Page GPA | Contains the guest physical memory page number of the guest page containing an I/O port intercept control bitmap (used by the higher virtual trust level to specify which particular I/O port access controls are locked). |
| Enable | Enables the I/O port intercept control bitmap page. |

Table IX illustrates an example of an HV_X64_MSR_VSM_MSR_CTL MSR, which controls which MSR accesses trigger an intercept into a higher virtual trust level. The HV_X64_MSR_VSM_MSR_CTL MSR is for an individual virtual processor, and is shared by the virtual trust levels of the virtual processor (although the HV_X64_MSR_VSM_MSR_CTL MSR is not available in the lowest virtual trust level).

TABLE IX

| Field | Description |
| --- | --- |
| MSR Control Page GPA | Contains the guest physical memory page number of the guest page containing an MSR intercept control bitmap (used by the higher virtual trust level to specify which particular MSRs are locked). |
| Enable | Enables the MSR intercept control bitmap page. |

It should be noted that one aspect of the techniques discussed herein is that a higher virtual trust level cannot be pre-empted by a lower virtual trust P level. Thus, when a virtual processor is running at a higher virtual trust level, the only way the virtual processor can switch to a lower virtual trust level is when software voluntarily switches to the lower virtual trust level by performing a VTL exit. No external events (e.g., interrupts, etc.) can trigger an automatic switch from a higher virtual trust level to a lower virtual trust level.

It should further be noted that the virtual trust levels implemented using the techniques discussed herein are independent of any protection rings or other protection mechanisms implemented by physical processors of the computing device 300. The techniques discussed herein are independent of the physical processor architecture, and thus can be implemented across any number of different processor architectures. Furthermore, the techniques discussed herein can support any number of virtual trust levels, including different numbers of virtual trust levels for different virtual processors in the same and/or different virtual machines.

It should also be noted that one or more virtual processors of the computing device 300 can support execution of code in multiple different modes, including at least a kernel mode (also referred to as kernel-mode, supervisor mode, or supervisor-mode) and a user mode (also referred to as user-mode). The techniques discussed herein are independent of any such mode that code is being executed in in a virtual processor. The memory access protections discussed herein are applied based on the virtual trust level that the virtual processor is operating in, and are applied regardless of whether the virtual processor is executing code in kernel mode or user mode. Thus, even if a virtual processor is executing code in kernel mode, the memory access protections for a virtual trust level can only be changed by the virtual secure mode module based on the active virtual trust level as discussed above (whether the virtual processor is executing in kernel mode or user mode is irrelevant). Although additional protections may be provided by the virtual processor based on the mode (e.g., user or kernel) in which it is executing code, those protections are independent of the memory access protections discussed herein that are applied based on the virtual trust level.

Thus, the techniques discussed herein provide an environment that is more privileged than an operating system running in kernel mode. For example, when running in VTL 1, the VTL 0 memory access protection for a memory page can be set to "no access", and data or code can be stored in the memory page. This setting puts the memory page in a "secure" mode, making the memory page inaccessible to programs running in VTL 0. Thus, even if the operating system is running in kernel mode, the data or code stored in the memory page is inaccessible to the operating system if the operating system is running in VTL 0.

However, the techniques discussed herein can be used in conjunction with virtual processors supporting different modes of execution or protection rings. For example, a virtual processor can have its own kernel mode and user mode in VTL 1, and have its own kernel mode and user mode in VTL 0. Thus, an address space in VTL 1 cannot access another in VTL 1 unless allowed to do so by the VTL 1 kernel mode. However, VTL 0 kernel mode still cannot access any address space in VTL 1 (assuming the memory pages of the address space in VTL 1 have been marked as such).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
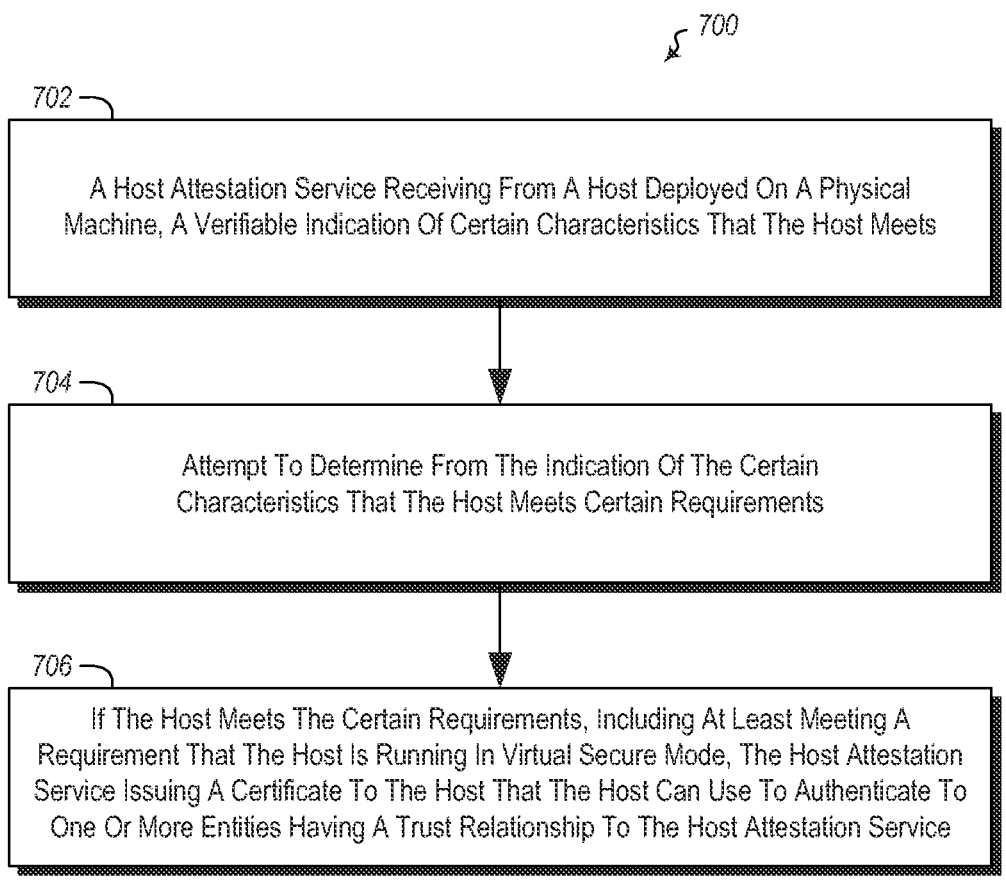
FIG. 7 is a flowchart illustrating a method of establishing trust for a host.

Referring now to FIG. 7, a method 700 is illustrated. The method 700 may be practiced in a computing environment and includes acts for establishing trust for a host. The method 700 includes a host attestation service receiving from a host deployed on a physical machine, a verifiable indication of certain characteristics that the host meets (act 702). For example, FIG. 2 illustrates a host 230 sending a request 260 that is received by a HAS 258. The request may include verifiable proof of certain host characteristics.

The method 700 further includes attempting to determine from the indication of the certain characteristics that the host meets certain requirements (act 704). For example, the HAS 258 may attempt to verify the proof in the request 260.

If the host meets the certain requirements, including at least meeting a requirement that the host contains a trusted execution environment (TEE), the host attestation service issues a certificate to the host that the host can use to authenticate to one or more entities having a trust relationship to the host attestation service (act 706). Thus, as illustrated in FIG. 2, the HAS 258 issues a certificate 257 that can be used by the host 230 obtain various keys or other privileges.

The method 700 may be practiced where the certain requirements further include a requirement related to a TPM (trusted platform module) on a physical machine implementing the host. For example, embodiments may require that a TPM be installed at a physical machine implementing the host and/or that the TPM be used in a particular way or for particular purposes. Alternatively or additionally, the certain requirements further include a requirement related to an ARM TrustZone and/or Intel SGX capability.

The method 700 may further include, as a result of a failure in determining that the physical machine implementing the host verifiably meets the certain requirements, notifying a Virtual Machine Manager (VMM) configured to deploy guest virtual machines that the host does not meet the certain requirements. In some such embodiments, this may be done so that the VMM can avoid deploying guest virtual machines on the host to prevent doomed virtual machine deployments to untrusted hosts, as described in the description above.

The method 700 may further include, as a result of a failure in determining that the host verifiably meets the certain requirements, notifying a Virtual Machine Manager (VMM) that the host is not available for deployments of guest virtual machines.

The method 700 may be practiced where the certain requirements further comprise a requirement that a correct and trustworthy UEFI (unified extensible firmware interface) report be provided for a physical host machine implementing the host to verify that an uncompromised boot has occurred. For example, this may be done to verify that no root kits have been installed on the host.

The method 700 may be practiced where the certain requirements further comprise a requirement that a verifiable indication be provided that the host includes a correct HVCI (Hypervisor-enforced Code Integrity) policy validation.

The method 700 may be practiced where the certain requirements further comprise a requirement that the host be located in a particular geographical location. For example, certain entities may wish to restrict where virtual machines can be deployed for reasons such as political reasons, policy compliance reasons, or for other reasons. This may include where the host is not located in a particular geographical. In particular, the requirement may be that the host is located in a particular geographical location that is not some excluded geographical location. Thus, the method 700 may be practiced where the certain requirements further comprise a requirement that the host not be located in a particular geographical location.

The method 700 may be practiced where the certain requirements further comprise a requirement that the host be coupled to a secure network. In embodiments, a secure network may be characterized by one or more properties, such as being physically and/or logically isolated, being located within a given physical building, secured using Kerberos, secured using Network Access Protection, secured against eavesdropping attacks using known methods, and secured against replay attacks using known methods. The method 700 may be practiced where the certain requirements further comprise a requirement selected from the group consisting of a matching secure boot policy, an absence of a boot debugger, an absence of a kernel debugger, an absence of debugging functionality, and a predetermined configuration of a software in the pre-OS boot stack.

The method 700 may further include creating a trust relationship between the host attestation service and a key distribution service from which the host can obtain keys by presenting the certificate.

The method 700 may be practiced where the method is performed in an environment where the host attestation service is implemented in an environment with a fabric management system, where the fabric management system is configured to administer at least one of the host operating system, the host configuration, HVCI whitelists, HVCI revocation lists, UEFI whitelists or UEFI revocation list. In some such embodiments, a different authentication and/or authorization service is used to authenticate administrators of the host attestation service than is used to authenticate administrators of the fabric management system. This separation of administration can help prevent "inside-job" compromises of security by requiring collusion by administrators to affect such compromises.

The method 700 may be practiced where the method is performed in an environment where the host attestation service is implemented in an environment with a virtual machine manager, where the virtual machine manager is configured to deploy shielded guest virtual machines to the host, but wherein the virtual machine manager is unable to decrypt the shielded guest virtual machines. Thus, virtual machines can be deployed by the VMM, but can still be kept secret from the VMM. In some such embodiments, the method 700 may be practiced in an environment where a different authentication service is used to authenticate administrators of the host attestation service than is used to authenticate administrators of the virtual machine manager. Again, this can help to prevent security compromises by requiring collusion for any such compromise. In some embodiments, the same authentication service but with a different security configuration may be used. For example, a single authentication service might provide a normal password-based authentication system, and a smartcard-based system.

Figure 8:
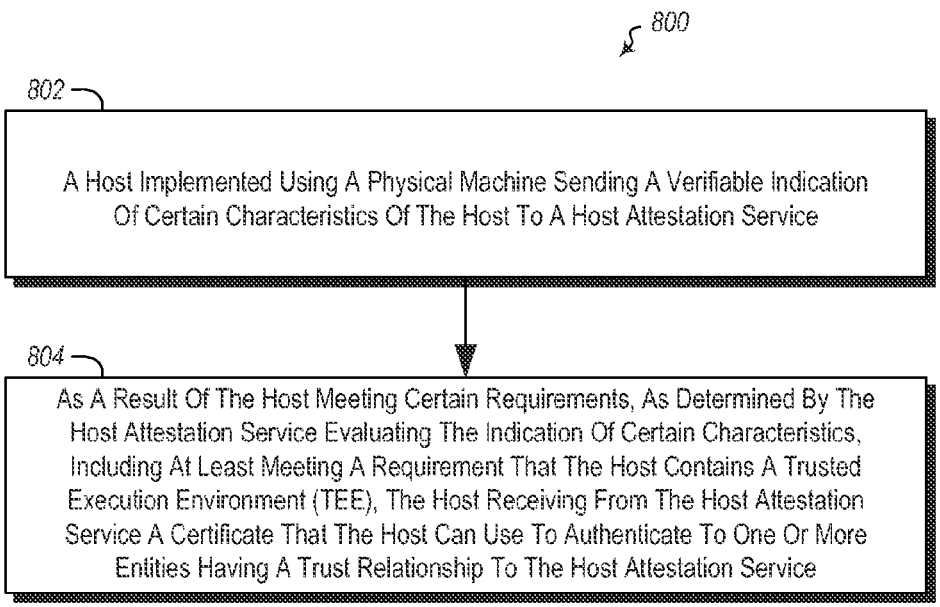
FIG. 8 is a flowchart illustrating another method of establishing trust for a host.

Referring now to FIG. 8, a method 800 is illustrated. The method 800 may be practiced in a computing environment. The method includes acts for establishing trust for a host. The method a host implemented using a physical machine sending a verifiable indication of certain characteristics of the host to a host attestation service (act 802).

As a result of the host meeting certain requirements, as determined by the host attestation service evaluating the indication of certain characteristics, including at least meeting a requirement that the host contains a trusted execution environment (TEE), the method 802 includes the host receiving from the host attestation service a certificate that the host can use to authenticate to one or more entities having a trust relationship to the host attestation service (act 804).

The method 800 may be practiced where the certain requirements further comprise a requirement related to a TPM (trusted platform module) on the physical machine implementing the host. Alternatively or additionally, the certain requirements further include a requirement related to an ARM TrustZone and/or Intel SGX capability.

The method 800 may be practiced where the certain requirements further comprise a requirement that a correct and trustworthy UEFI (unified extensible firmware interface) report be provided for the physical machine on which the host is implemented.

The method 800 may be practiced where the certain requirements further comprise a requirement that a verifiable indication be provided that the host includes a correct HVCI (Hypervisor-enforced Code Integrity) policy validation.

The method 800 may be practiced where the certain requirements further comprise a requirement that the host be located in a particular geographical location. This may include where the host is not located in a particular geographical. In particular, the requirement may be that the host is located in a particular geographical location that is not some excluded geographical location. Thus, the method 800 may be practiced where the certain requirements further comprise a requirement that the host not be located in a particular geographical location.

The method 800 may be practiced where the certain requirements further comprise a requirement that the host be coupled to a secure network.

The method 800 may be practiced in an environment where there is a trust relationship between the host attestation service and a key distribution service from which the host can obtain keys by presenting the certificate. In some such embodiments, the method 800 may be practiced where an shielded guest virtual machine is deployed by a virtual machine manager at the request of a tenant to the host, where the virtual machine manager is unable to decrypt the shielded guest virtual machine. The method may further include the host using the certificate to obtain a key from a key distribution service that trusts the host attestation service in that the key distribution service accepts certificates signed by the host attestation service. The host then uses the key to decrypt the shielded guest virtual machine so that the guest virtual machine can be run on the host. In some such embodiments, the host prepares an encrypted message regarding security details of the deployment of the guest virtual machine (e.g. a certificate message to the tenant indicating that the deployment was done in a secure or encrypted way). The encrypted message is not able to be decrypted by the virtual machine manager, but able to be decrypted by the tenant. The host sends the encrypted message to the virtual machine manager, where it can be forwarded on to the tenant without the virtual machine manager being able to read the encrypted message.

Figure 9:
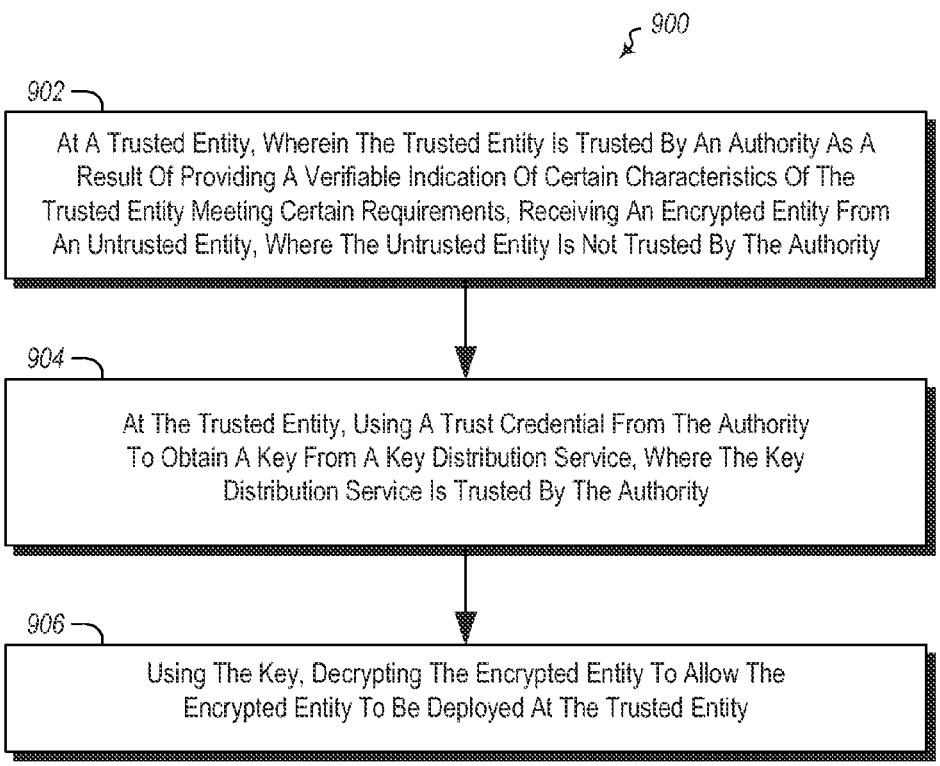
FIG. 9 is a flowchart illustrating another method of deploying an encrypted entity on a trusted entity.

Referring now to FIG. 9, a method 900 is illustrated. The method 900 may be practiced in a computing environment and includes acts for deploying an encrypted entity on a trusted entity. The method 900 includes, at a trusted entity, wherein the trusted entity is trusted by an authority as a result of providing a verifiable indication of certain characteristics of the trusted entity meeting certain requirements, receiving an encrypted entity from an untrusted entity, where the untrusted entity is not trusted by the authority (act 902). The method 100 further includes at the trusted entity, using a trust credential from the authority to obtain a key from a key distribution service, where the key distribution service is trusted by the authority (act 904). The method further includes, using the key, decrypting the encrypted entity to allow the encrypted entity to be deployed at the trusted entity (act 906).

The method 900 may be practiced where the certain requirements comprise a requirement that the trusted entity be a virtual machine having a trusted execution environment (TEE).

The method 900 may be practiced where the certain requirements comprise a requirement related to a TPM (trusted platform module) on a physical machine implementing the trusted entity. Alternatively or additionally, the certain requirements further include a requirement related to an ARM TrustZone and/or Intel SGX capability.

The method 900 may be practiced where the certain requirements comprise a requirement that the trusted entity be implemented using a physical machine having a correct and trustworthy UEFI report.

The method 900 may be practiced where the certain requirements comprise a requirement that the trusted entity includes a correct HVCI (Hypervisor-enforced Code Integrity) policy validation.

The method 900 may be practiced where the certain requirements comprise a requirement that the trusted entity be physically located in a particular geographical location. This may include where the trusted entity is not located in a particular geographical. In particular, the requirement may be that the trusted entity is located in a particular geographical location that is not some excluded geographical location. Thus, the method 900 may be practiced where the certain requirements comprise a requirement that the trusted entity not be physically located in a particular geographical location.

The method 900 may be practiced where the certain requirements comprise a requirement that the trusted entity be coupled to a secure network.

The method 900 may be practiced where the encrypted entity is a terminal server to be deployed on the trusted entity.

The method 900 may be practiced where the encrypted entity comprises network translation information to be deployed on the trusted entity.

The method 900 may be practiced where the encrypted entity comprises sensitive data (such as price lists, company strategy, confidential personal information, etc.) to be deployed on the trusted entity.

The method 900 may be practiced where the encrypted entity comprises configuration data used to configure the trusted entity or other entities to be deployed on the trusted entity.

The method 900 may be practiced where the encrypted entity is deployed with a plurality of other encrypted entities as part of a service model deployment.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of establishing trust for a host, the method comprising:
   a host attestation service receiving from a host deployed on a physical machine, a verifiable indication of certain characteristics that the host meets;

attempting to determine from the indication of the certain characteristics that the host meets certain requirements; and if the host meets the certain requirements, including at least meeting a requirement that the host contains a trusted execution environment (TEE), the host attestation service issuing a certificate to the host that the host can use to authenticate to one or more entities having a trust relationship with the host attestation service, wherein the certificate is configured for use by the host to obtain a key from a key distribution service having a trust relationship with the host attestation service, in response to the certificate being provided to the key distribution service, and wherein the key is configured for use by the host to decrypt a shielded guest virtual machine that is deployed by a virtual machine manager at a request of a tenant to the host so that a guest virtual machine can be run on the host.

2. The method of claim 1, wherein the certain requirements further comprise a requirement related to a TPM (trusted platform module) on a physical machine implementing the host.

3. The method of claim 1, the method further comprising as a result of a failure in determining that the physical machine implementing the host verifiably meets the certain requirements, notifying a Virtual Machine Manager (VMM) configured to deploy guest virtual machines that the host does not meet the certain requirements.

4. The method of claim 1, the method further comprising, as a result of a failure in determining that the host verifiably meets the certain requirements, notifying a Virtual Machine Manager (VMM) that the host is not available for deployments of shielded guest virtual machines.

5. The method of claim 1, wherein the certain requirements further comprise a requirement that a correct and trustworthy UEFI (unified extensible firmware interface) report be provided for a physical host machine implementing the host to verify that an uncompromised boot has occurred.

6. The method of claim 1, wherein the certain requirements further comprise a requirement that a verifiable indication be provided that the host includes a correct HVCI (Hypervisor-enforced Code Integrity) policy validation.

7. The method of claim 1, wherein the certain requirements further comprise a requirement that the host be located in a particular geographical location.

8. The method of claim 1, wherein the certain requirements further comprise a requirement that the host be coupled to a secure network.

9. The method of claim 1, further comprising creating a trust relationship between the host attestation service and the key distribution service from which the host can obtain keys by presenting the certificate.

10. The method of claim 1, wherein the method is performed in an environment where the host attestation service is implemented in an environment with a fabric management system, where the fabric management system is configured to administer at least one of the host operating system, the host configuration, HVCI whitelists, HVCI revocation lists, UEFI whitelists or UEFI revocation list, and wherein a different authentication and/or authorization service is used to authenticate administrators of the host attestation service than is used to authenticate administrators of the fabric management system.

11. The method of claim 1, wherein the method is performed in an environment where the host attestation service is implemented in an environment with the virtual machine manager, where the virtual machine manager is configured to deploy shielded guest virtual machines to the host, but wherein the virtual machine manager is unable to decrypt the shielded guest virtual machines.

12. The method of claim 11, wherein the method is practiced in an environment where a different authentication service is used to authenticate administrators of the host attestation service than is used to authenticate administrators of the virtual machine manager.

13. In a computing environment, a method of establishing trust for a host, the method comprising:

a host implemented using a physical machine sending a verifiable indication of certain characteristics of the host to a host attestation service; and as a result of the host meeting certain requirements, as determined by the host attestation service evaluating the indication of certain characteristics, including at least meeting a requirement that the host contains a trusted execution environment (TEE), the host receiving from the host attestation service a certificate that the host can use to authenticate to one or more entities having a trust relationship to the host attestation service the host obtaining a key from a key distribution service in response to providing the certificate to the key distribution service, wherein the key distribution service trusts the host attestation service in that the key distribution service accepts certificates signed by the host attestation service; and the host using the key to decrypt a shielded guest virtual machine that is deployed by a virtual machine manager at a request of a tenant to the host so that a guest virtual machine can be run on the host.

14. The method of claim 13, wherein the certain requirements further comprise a requirement selected from the group consisting of:

(a) a requirement related to a TPM (trusted platform module) on the physical machine implementing the host, (b) a requirement that a correct and trustworthy UEFI (unified extensible firmware interface) report be provided for the physical machine on which the host is implemented, (c) a requirement that a verifiable indication be provided that the host includes a correct HVCI (Hypervisor-enforced Code Integrity) policy validation, (d) a requirement that the host be located in a particular geographical location, and (e) a requirement that the host be coupled to a secure network.

15. The method of claim 13, further comprising:

the host preparing an encrypted message regarding security details of the deployment of the guest virtual machine, wherein the encrypted message is not able to be decrypted by the virtual machine manager, but able to be decrypted by the tenant; and the host sending the encrypted message to the virtual machine manager, where it can be forwarded on to the tenant without the virtual machine manager being able to read the encrypted message.

16. A computing system comprising a physical machine on which a host is implemented, the computing system comprising:

one or more processors; and one or more storage media having stored computer-executable instructions which are executable by the one or more processors for causing the host to perform the following method of establishing a trust for the host, wherein the method includes:

the host sending a verifiable indication of certain characteristics of the host to a host attestation service; and as a result of the host meeting certain requirements, as determined by the host attestation service evaluating the indication of certain characteristics, including at least meeting a requirement that the host contains a trusted execution environment (TEE), the host receiving from the host attestation service a certificate that the host can use to authenticate to one or more entities having a trust relationship to the host attestation service;

the host obtaining a key from a key distribution service in response to providing the certificate to the key distribution service, wherein the key distribution service trusts the host attestation service in that the key distribution service accepts certificates signed by the host attestation service; and the host using the key to decrypt a shielded guest virtual machine that is deployed by a virtual machine manager at a request of a tenant to the host computing system so that a guest virtual machine can be run on the host.

17. The computing system of claim 16, wherein the method further comprises:

the host preparing an encrypted message regarding security details of the deployment of the guest virtual machine, wherein the encrypted message is not able to be decrypted by the virtual machine manager, but able to be decrypted by the tenant; and the host sending the encrypted message to the virtual machine manager, where it can be forwarded on to the tenant without the virtual machine manager being able to read the encrypted message.

18. The computing system of claim 16, wherein the certain requirements comprise a requirement related to a TPM (trusted platform module) on the physical machine implementing the host.

19. The computing system of claim 16, wherein the certain requirements comprise a requirement that a correct and trustworthy UEFI (unified extensible firmware interface) report be provided for the physical machine on which the host is implemented.

20. The computing system of claim 16, wherein the certain requirements comprise a requirement that a verifiable indication be provided that the host includes a correct HVCI (Hypervisor-enforced Code Integrity) policy validation.

21. The computing system of claim 16, wherein the certain requirements comprise a requirement that the host be located in a particular geographical location.

22. The computing system of claim 16, wherein the certain requirements comprise a requirement that the host be coupled to a secure network.

* * * * *